US010239739B2

(12) United States Patent
High et al.

(10) Patent No.: US 10,239,739 B2
(45) Date of Patent: Mar. 26, 2019

(54) MOTORIZED TRANSPORT UNIT WORKER SUPPORT SYSTEMS AND METHODS

(71) Applicant: Walmart Apollo, LLC, Bentonville, AR (US)

(72) Inventors: Donald R. High, Noel, MO (US); Michael D. Atchley, Springdale, AR (US); David C. Winkle, Bella Vista, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/061,507

(22) Filed: Mar. 4, 2016

(65) Prior Publication Data
US 2016/0259343 A1 Sep. 8, 2016

Related U.S. Application Data

(60) Provisional application No. 62/129,726, filed on Mar. 6, 2015, provisional application No. 62/129,727, filed
(Continued)

(51) Int. Cl.
H04W 4/80 (2018.01)
H04W 4/40 (2018.01)
(Continued)

(52) U.S. Cl.
CPC ............ B66F 9/063 (2013.01); A47F 3/08 (2013.01); A47F 10/04 (2013.01); A47F 13/00 (2013.01);
(Continued)

(58) Field of Classification Search
CPC .......... H04W 4/80; H04W 4/40; H04W 4/33; H04W 4/30; H04W 4/02; H04N 7/18;
(Continued)

(56) References Cited

U.S. PATENT DOCUMENTS 1,774,653 A  9/1930 Marriott
2,669,345 A  2/1954 Brown
(Continued)

FOREIGN PATENT DOCUMENTS

CA  2524037  5/2006
CA  2625885  4/2007
(Continued)

OTHER PUBLICATIONS

KR20120100505A-preview.pdf—Translation of KR 2012-0100505 A obtained from IP.com on Jun. 7, 2017.*
(Continued)

Primary Examiner — Jeffrey C Boomer
(74) Attorney, Agent, or Firm — Fitch, Even, Tabin & Flannery LLP

(57) ABSTRACT

Some embodiments provide systems and methods to assist product stocking on a sales floor of a retail shopping facility. In some implementations, a system comprises a plurality of motorized transport units that are each configured to perform multiple different types of tasks at a retail shopping facility; and a central computer system configured to coordinate the plurality of motorized transport units in performing the multiple different tasks comprising instruct a motorized transport unit to retrieve a specified stocking cart that is carrying a plurality of products that are to be restocked onto product supports that are positioned on the sales floor where customers travel in shopping for products, and further instruct the motorized transport unit to autonomously transport the stocking cart to a specified stocking location on the sales floor corresponding to at least one of the plurality of products carried by the stocking cart.

16 Claims, 8 Drawing Sheets

Related U.S. Application Data on Mar. 6, 2015, provisional application No. 62/138,877, filed on Mar. 26, 2015, provisional application No. 62/138,885, filed on Mar. 26, 2015, provisional application No. 62/152,421, filed on Apr. 24, 2015, provisional application No. 62/152,465, filed on Apr. 24, 2015, provisional application No. 62/152,440, filed on Apr. 24, 2015, provisional application No. 62/152,630, filed on Apr. 24, 2015, provisional application No. 62/152,711, filed on Apr. 24, 2015, provisional application No. 62/152,610, filed on Apr. 24, 2015, provisional application No. 62/152,667, filed on Apr. 24, 2015, provisional application No. 62/157,388, filed on May 5, 2015, provisional application No. 62/165,579, filed on May 22, 2015, provisional application No. 62/165,416, filed on May 22, 2015, provisional application No. 62/165,586, filed on May 22, 2015, provisional application No. 62/171,822, filed on Jun. 5, 2015, provisional application No. 62/175,182, filed on Jun. 12, 2015, provisional application No. 62/182,339, filed on Jun. 19, 2015, provisional application No. 62/185,478, filed on Jun. 26, 2015, provisional application No. 62/194,131, filed on Jul. 17, 2015, provisional application No. 62/194,119, filed on Jul. 17, 2015, provisional application No. 62/194,121, filed on Jul. 17, 2015, provisional application No. 62/194,127, filed on Jul. 17, 2015, provisional application No. 62/202,744, filed on Aug. 7, 2015, provisional application No. 62/202,747, filed on Aug. 7, 2015, provisional application No. 62/205,548, filed on Aug. 14, 2015, provisional application No. 62/205,569, filed on Aug. 14, 2015, provisional application No. 62/205,555, filed on Aug. 14, 2015, provisional application No. 62/205,539, filed on Aug. 14, 2015, provisional application No. 62/207,858, filed on Aug. 20, 2015, provisional application No. 62/214,826, filed on Sep. 4, 2015, provisional application No. 62/214,824, filed on Sep. 4, 2015, provisional application No. 62/292,084, filed on Feb. 5, 2016, provisional application No. 62/302,547, filed on Mar. 2, 2016, provisional application No. 62/302,567, filed on Mar. 2, 2016, provisional application No. 62/302,713, filed on Mar. 2, 2016, provisional application No. 62/303,021, filed on Mar. 3, 2016.

(51) Int. Cl.

| | | |
|---|---|---|
| H04W 4/33 | (2018.01) | |
| H04W 4/30 | (2018.01) | |
| H04W 4/02 | (2018.01) | |
| H04N 7/18 | (2006.01) | |
| H04N 5/77 | (2006.01) | |
| H04N 13/282 | (2018.01) | |
| H04L 29/08 | (2006.01) | |
| H04B 10/116 | (2013.01) | |
| H04B 1/38 | (2015.01) | |
| H02J 7/00 | (2006.01) | |
| G10L 17/22 | (2013.01) | |
| G10L 15/22 | (2006.01) | |
| G10L 13/04 | (2013.01) | |
| G08G 1/00 | (2006.01) | |
| G06T 7/73 | (2017.01) | |
| G06T 7/593 | (2017.01) | |
| G06Q 50/30 | (2012.01) | |
| G06Q 50/28 | (2012.01) | |
| G06Q 30/06 | (2012.01) | |
| G06Q 30/02 | (2012.01) | |
| G06Q 30/00 | (2012.01) | |
| G06Q 10/10 | (2012.01) | |
| G06Q 10/08 | (2012.01) | |
| G06Q 10/06 | (2012.01) | |
| G06Q 10/02 | (2012.01) | |
| G06Q 10/00 | (2012.01) | |
| G06K 9/78 | (2006.01) | |
| G06K 9/62 | (2006.01) | |
| G06K 9/32 | (2006.01) | |
| G06K 9/18 | (2006.01) | |
| G06K 9/00 | (2006.01) | |
| G06K 7/14 | (2006.01) | |
| G06K 7/10 | (2006.01) | |
| G06F 3/01 | (2006.01) | |
| G06F 17/30 | (2006.01) | |
| G05D 1/04 | (2006.01) | |
| G05D 1/02 | (2006.01) | |
| G05D 1/00 | (2006.01) | |
| G05B 19/12 | (2006.01) | |
| G05B 19/048 | (2006.01) | |
| G01S 1/72 | (2006.01) | |
| G01S 1/70 | (2006.01) | |
| G01S 1/02 | (2010.01) | |
| G01C 21/20 | (2006.01) | |
| E01H 5/12 | (2006.01) | |
| E01H 5/06 | (2006.01) | |
| B66F 9/06 | (2006.01) | |
| B65F 3/00 | (2006.01) | |
| B62B 5/00 | (2006.01) | |
| B60P 3/06 | (2006.01) | |
| B60L 11/18 | (2006.01) | |
| B07C 5/342 | (2006.01) | |
| B07C 5/28 | (2006.01) | |
| A47L 11/40 | (2006.01) | |
| A47F 3/08 | (2006.01) | |
| A47F 13/00 | (2006.01) | |
| A47F 10/04 | (2006.01) | |
| A47F 10/02 | (2006.01) | |
| A47F 10/00 | (2006.01) | |
| H04W 4/04 | (2009.01) | |

(52) U.S. Cl.
CPC ............ *A47L 11/4011* (2013.01); *B07C 5/28* (2013.01); *B07C 5/3422* (2013.01); *B60L 11/1833* (2013.01); *B60L 11/1844* (2013.01); *B60P 3/06* (2013.01); *B62B 5/0026* (2013.01); *B62B 5/0069* (2013.01); *B62B 5/0076* (2013.01); *B65F 3/00* (2013.01); *E01H 5/061* (2013.01); *E01H 5/12* (2013.01); *G01C 21/206* (2013.01); *G01S 1/02* (2013.01); *G01S 1/70* (2013.01); *G01S 1/72* (2013.01); *G05B 19/048* (2013.01); *G05D 1/0011* (2013.01); *G05D 1/0016* (2013.01); *G05D 1/0022* (2013.01); *G05D 1/0027* (2013.01); *G05D 1/0061* (2013.01); *G05D 1/0088* (2013.01); *G05D 1/021* (2013.01); *G05D 1/028* (2013.01); *G05D 1/0214* (2013.01); *G05D 1/0219* (2013.01); *G05D 1/0234* (2013.01); *G05D 1/0246* (2013.01); *G05D 1/0255* (2013.01); *G05D 1/0276* (2013.01); *G05D 1/0289* (2013.01); *G05D 1/0291* (2013.01); *G05D 1/0293* (2013.01); *G05D 1/0297* (2013.01); *G05D 1/04* (2013.01); *G06F 3/017* (2013.01); *G06K 9/00208* (2013.01); *G06K 9/00671* (2013.01); *G06K 9/00711* (2013.01);

G06K 9/00771 (2013.01); *G06K 9/00791* (2013.01); *G06K 9/00805* (2013.01); *G06K 9/18* (2013.01); *G06K 9/3208* (2013.01); *G06K 9/6256* (2013.01); *G06K 9/78* (2013.01); *G06Q 10/02* (2013.01); *G06Q 10/06311* (2013.01); *G06Q 10/083* (2013.01); *G06Q 10/087* (2013.01); *G06Q 10/1095* (2013.01); *G06Q 10/30* (2013.01); *G06Q 30/016* (2013.01); *G06Q 30/0281* (2013.01); *G06Q 30/0601* (2013.01); *G06Q 30/0605* (2013.01); *G06Q 30/0613* (2013.01); *G06Q 30/0617* (2013.01); *G06Q 30/0619* (2013.01); *G06Q 30/0631* (2013.01); *G06Q 30/0633* (2013.01); *G06Q 30/0635* (2013.01); *G06Q 30/0639* (2013.01); *G06Q 30/0641* (2013.01); *G06Q 50/28* (2013.01); *G06Q 50/30* (2013.01); *G06T 7/593* (2017.01); *G06T 7/74* (2017.01); *G08G 1/20* (2013.01); *G10L 13/043* (2013.01); *G10L 15/22* (2013.01); *G10L 17/22* (2013.01); *H02J 7/0027* (2013.01); *H04B 10/116* (2013.01); *H04L 67/12* (2013.01); *H04L 67/141* (2013.01); *H04L 67/143* (2013.01); *H04N 5/77* (2013.01); *H04N 7/18* (2013.01); *H04N 7/183* (2013.01); *H04N 7/185* (2013.01); *H04N 13/282* (2018.05); *H04W 4/02* (2013.01); *H04W 4/043* (2013.01); *H04W 4/30* (2018.02); *H04W 4/33* (2018.02); *H04W 4/40* (2018.02); *H04W 4/80* (2018.02); *A47F 2010/005* (2013.01); *A47F 2010/025* (2013.01); *A47L 2201/04* (2013.01); *B07C 2501/0045* (2013.01); *B07C 2501/0054* (2013.01); *B07C 2501/0063* (2013.01); *B60Y 2410/10* (2013.01); *B65F 2210/168* (2013.01); *G05B 19/124* (2013.01); *G05B 2219/23363* (2013.01); *G05B 2219/39107* (2013.01); *G05D 2201/0203* (2013.01); *G05D 2201/0216* (2013.01); *G06F 17/30979* (2013.01); *G06K 7/10297* (2013.01); *G06K 7/10821* (2013.01); *G06K 7/1413* (2013.01); *G06K 2009/00738* (2013.01); *G06Q 10/06315* (2013.01); *G06T 2207/10028* (2013.01); *G10L 2015/223* (2013.01); *H02J 2007/0096* (2013.01); *H04B 1/38* (2013.01); *Y02W 30/82* (2015.05); *Y02W 30/827* (2015.05); *Y02W 90/20* (2015.05); *Y10S 901/01* (2013.01)

(58) Field of Classification Search
CPC ........ H04N 5/77; H04N 13/282; H04L 29/08; H04B 10/116; H04B 1/38; H02J 7/00; G10L 17/22; G10L 15/22; G10L 13/04; G08G 1/00; G06T 7/73; G06T 7/593; G06Q 50/30; G06Q 50/28; G06Q 30/06; G06Q 30/02; G06Q 30/00; G06Q 10/10; G06Q 10/08; G06Q 10/06; G06Q 10/02; G06Q 10/00; G06K 9/78; G06K 9/62; G06K 9/32; G06K 9/18; G06K 9/00; G06K 7/14; G06K 7/10; G06F 3/01; G06F 17/30; G05D 1/04; G05D 1/02; G05D 1/00; G05B 19/12; G05B 19/048; G01S 1/72; G01S 1/70; G01S 1/02; G01C 21/20; E01H 5/12; E01H 5/06; B66F 9/06; B65F 3/00; B62B 5/00; B60P 3/06; B60L 11/18; B07C 5/342; B07C 5/28; A47L 11/40; A47F 3/08; A47F 13/00; A47F 10/04; A47F 10/02; A47F 10/00

See application file for complete search history.

(56) References Cited

U.S. PATENT DOCUMENTS

| | | |
|---|---|---|
| 3,765,546 A | 10/1973 | Westerling |
| 4,071,740 A | 1/1978 | Gogulski |
| 4,158,416 A | 6/1979 | Podesta |
| 4,588,349 A | 5/1986 | Reuter |
| 4,672,280 A | 6/1987 | Honjo |
| 4,777,416 A | 10/1988 | George, II |
| 4,791,482 A | 12/1988 | Barry |
| 4,868,544 A | 9/1989 | Havens |
| 4,911,608 A | 3/1990 | Krappitz |
| 5,119,087 A | 6/1992 | Lucas |
| 5,279,672 A | 1/1994 | Betker |
| 5,287,266 A | 2/1994 | Malec |
| 5,295,551 A | 3/1994 | Sukonick |
| 5,363,305 A | 11/1994 | Cox |
| 5,380,138 A | 1/1995 | Kasai |
| 5,384,450 A | 1/1995 | Goetz, Jr. |
| 5,395,206 A | 3/1995 | Cerny, Jr. |
| 5,402,051 A | 3/1995 | Fujiwara |
| 5,548,515 A | 8/1996 | Pilley |
| 5,632,381 A | 5/1997 | Thust |
| 5,652,489 A | 7/1997 | Kawakami |
| 5,671,362 A | 9/1997 | Cowe |
| 5,777,571 A | 7/1998 | Chuang |
| 5,801,340 A | 9/1998 | Peter |
| 5,917,174 A | 6/1999 | Moore |
| 5,920,261 A | 7/1999 | Hughes |
| 5,969,317 A | 10/1999 | Espy |
| 6,018,397 A | 1/2000 | Cloutier |
| 6,199,753 B1 | 3/2001 | Tracy |
| 6,201,203 B1 | 3/2001 | Tilles |
| 6,240,342 B1 | 5/2001 | Fiegert |
| 6,339,735 B1 | 1/2002 | Peless |
| 6,365,857 B1 | 4/2002 | Maehata |
| 6,374,155 B1 | 4/2002 | Wallach |
| 6,394,519 B1 | 5/2002 | Byers |
| 6,431,078 B2 | 8/2002 | Serrano |
| 6,522,952 B1 | 2/2003 | Arai |
| 6,525,509 B1 | 2/2003 | Petersson |
| 6,535,793 B2 | 3/2003 | Allard |
| 6,550,672 B1 | 4/2003 | Tracy |
| 6,571,693 B1 | 6/2003 | Kaldenberg |
| 6,584,375 B2 | 6/2003 | Bancroft |
| 6,584,376 B1 | 6/2003 | VanKommer |
| 6,600,418 B2 | 7/2003 | Francis |
| 6,601,759 B2 | 8/2003 | Fife |
| 6,606,411 B1 | 8/2003 | Loui |
| 6,626,632 B2 | 9/2003 | Guenzi |
| 6,633,800 B1 | 10/2003 | Ward |
| 6,655,897 B1 | 12/2003 | Harwell |
| 6,667,592 B2 | 12/2003 | Jacobs |
| 6,672,601 B1* | 1/2004 | Hofheins ............ A47F 10/06 280/47.34 |
| 6,678,583 B2 | 1/2004 | Nasr |
| 6,688,435 B1 | 2/2004 | Will |
| 6,728,597 B2 | 4/2004 | Didriksen |
| 6,731,204 B2 | 5/2004 | Lehmann |
| 6,745,186 B1 | 6/2004 | Testa |
| 6,752,582 B2 | 6/2004 | Garcia |
| 6,810,149 B1 | 10/2004 | Squilla |
| 6,816,085 B1 | 11/2004 | Haynes |
| 6,832,884 B2 | 12/2004 | Robinson |
| 6,841,963 B2 | 1/2005 | Song |
| 6,883,201 B2 | 4/2005 | Jones |
| 6,885,736 B2 | 4/2005 | Uppaluru |
| 6,886,101 B2 | 4/2005 | Glazer |
| 6,895,301 B2 | 5/2005 | Mountz |
| 6,910,828 B1 | 6/2005 | Hughes |
| 6,937,989 B2 | 8/2005 | McIntyre |
| 6,954,695 B2 | 10/2005 | Bonilla |
| 6,967,455 B2 | 11/2005 | Nakadai |

(56) References Cited

U.S. PATENT DOCUMENTS

| | | | |
|---|---|---|---|
| 6,975,997 B1 | 12/2005 | Murakami | |
| 7,039,499 B1 | 5/2006 | Nasr | |
| 7,066,291 B2 | 6/2006 | Martins | |
| 7,101,113 B2 | 9/2006 | Hughes | |
| 7,101,139 B1 | 9/2006 | Benedict | |
| 7,117,902 B2 | 10/2006 | Osborne | |
| 7,145,562 B2 | 12/2006 | Schechter | |
| 7,147,154 B2 | 12/2006 | Myers | |
| 7,177,820 B2 | 2/2007 | McIntyre | |
| 7,184,586 B2 | 2/2007 | Jeon | |
| 7,205,016 B2 | 4/2007 | Garwood | |
| 7,206,753 B2 | 4/2007 | Bancroft | |
| 7,222,363 B2 | 5/2007 | Rice | |
| 7,233,241 B2 | 6/2007 | Overhultz | |
| 7,234,609 B2 | 6/2007 | DeLazzer | |
| 7,261,511 B2 | 8/2007 | Felder | |
| 7,367,245 B2 | 5/2008 | Okazaki | |
| 7,381,022 B1 | 6/2008 | King | |
| 7,402,018 B2 | 7/2008 | Mountz | |
| 7,431,208 B2 | 10/2008 | Feldman | |
| 7,447,564 B2 | 11/2008 | Yasukawa | |
| 7,463,147 B1 | 12/2008 | Laffoon | |
| 7,474,945 B2 | 1/2009 | Matsunaga | |
| 7,487,913 B2 | 2/2009 | Adema | |
| 7,533,029 B2 | 5/2009 | Mallett | |
| 7,554,282 B2 | 6/2009 | Nakamoto | |
| 7,556,108 B2 | 7/2009 | Won | |
| 7,556,219 B2 | 7/2009 | Page | |
| 7,587,756 B2 | 9/2009 | Peart | |
| 7,613,544 B2 | 11/2009 | Park | |
| 7,627,515 B2 | 12/2009 | Borgs | |
| 7,636,045 B2 | 12/2009 | Sugiyama | |
| 7,648,068 B2 | 1/2010 | Silverbrook | |
| 7,653,603 B1 | 1/2010 | Holtkamp | |
| 7,658,327 B2 | 2/2010 | Tuchman | |
| 7,689,322 B2 | 3/2010 | Tanaka | |
| 7,693,605 B2 | 4/2010 | Park | |
| 7,693,745 B1 | 4/2010 | Pomerantz | |
| 7,693,757 B2 | 4/2010 | Zimmerman | |
| 7,706,917 B1 | 4/2010 | Chiappetta | |
| 7,716,064 B2 | 5/2010 | McIntyre | |
| 7,726,563 B2 | 6/2010 | Scott | |
| 7,762,458 B2 | 7/2010 | Stawar | |
| 7,783,527 B2 | 8/2010 | Bonner | |
| 7,787,985 B2 | 8/2010 | Tsujimoto | |
| 7,817,394 B2 | 10/2010 | Mukherjee | |
| 7,826,919 B2 * | 11/2010 | D'Andrea | B66F 9/063 700/214 |
| 7,835,281 B2 | 11/2010 | Lee | |
| 7,894,932 B2 | 2/2011 | Mountz | |
| 7,894,939 B2 * | 2/2011 | Zini | G05B 19/41895 700/245 |
| 7,969,297 B2 | 6/2011 | Haartsen | |
| 7,996,109 B2 | 8/2011 | Zini | |
| 8,010,230 B2 | 8/2011 | Zini | |
| 8,032,249 B1 | 10/2011 | Shakes | |
| 8,041,455 B2 | 10/2011 | Thorne | |
| 8,050,976 B2 | 11/2011 | Staib | |
| 8,065,032 B2 | 11/2011 | Stifter | |
| 8,065,353 B2 | 11/2011 | Eckhoff-Hornback | |
| 8,069,092 B2 | 11/2011 | Bryant | |
| 8,083,013 B2 | 12/2011 | Bewley | |
| 8,099,191 B2 | 1/2012 | Blanc | |
| 8,103,398 B2 | 1/2012 | Duggan | |
| 8,195,333 B2 | 6/2012 | Ziegler | |
| 8,239,276 B2 | 8/2012 | Lin | |
| 8,244,041 B1 | 8/2012 | Silver | |
| 8,248,467 B1 | 8/2012 | Ganick | |
| 8,260,456 B2 | 9/2012 | Siegel | |
| 8,284,240 B2 | 10/2012 | Saint-Pierre | |
| 8,295,542 B2 | 10/2012 | Albertson | |
| 8,321,303 B1 | 11/2012 | Krishnamurthy | |
| 8,325,036 B1 | 12/2012 | Fuhr | |
| 8,342,467 B2 | 1/2013 | Stachowski | |
| 8,352,110 B1 | 1/2013 | Szybalski | |
| 8,359,122 B2 | 1/2013 | Koselka | |
| 8,380,349 B1 | 2/2013 | Hickman | |
| 8,393,846 B1 | 3/2013 | Coots | |
| 8,412,400 B2 | 4/2013 | D'Andrea | |
| 8,423,280 B2 | 4/2013 | Edwards | |
| 8,425,173 B2 | 4/2013 | Lert | |
| 8,429,004 B2 | 4/2013 | Hamilton | |
| 8,430,192 B2 | 4/2013 | Gillett | |
| 8,433,470 B1 | 4/2013 | Szybalski | |
| 8,433,507 B2 | 4/2013 | Hannah | |
| 8,437,875 B2 | 5/2013 | Hernandez | |
| 8,444,369 B2 * | 5/2013 | Watt | B65G 49/00 414/809 |
| 8,447,863 B1 | 5/2013 | Francis, Jr. | |
| 8,452,450 B2 | 5/2013 | Dooley | |
| 8,474,090 B2 | 7/2013 | Jones | |
| 8,494,908 B2 | 7/2013 | Herwig | |
| 8,504,202 B2 | 8/2013 | Ichinose | |
| 8,508,590 B2 | 8/2013 | Laws | |
| 8,510,033 B2 | 8/2013 | Park | |
| 8,511,606 B1 | 8/2013 | Lutke | |
| 8,515,580 B2 | 8/2013 | Taylor | |
| 8,516,651 B2 | 8/2013 | Jones | |
| 8,538,577 B2 | 9/2013 | Bell | |
| 8,544,858 B2 | 10/2013 | Eberlein | |
| 8,571,700 B2 | 10/2013 | Keller | |
| 8,572,712 B2 | 10/2013 | Rice | |
| 8,577,538 B2 | 11/2013 | Lenser | |
| 8,587,662 B1 | 11/2013 | Moll | |
| 8,588,969 B2 | 11/2013 | Frazier | |
| 8,594,834 B1 | 11/2013 | Clark | |
| 8,606,314 B2 | 12/2013 | Barnes, Jr. | |
| 8,606,392 B2 | 12/2013 | Wurman | |
| 8,639,382 B1 | 1/2014 | Clark | |
| 8,645,223 B2 | 2/2014 | Ouimet | |
| 8,649,557 B2 | 2/2014 | Hyung | |
| 8,656,550 B2 | 2/2014 | Jones | |
| 8,670,866 B2 | 3/2014 | Ziegler | |
| 8,671,507 B2 | 3/2014 | Jones | |
| 8,676,377 B2 | 3/2014 | Siegel | |
| 8,676,420 B2 | 3/2014 | Kume | |
| 8,676,480 B2 | 3/2014 | Lynch | |
| 8,700,230 B1 | 4/2014 | Hannah | |
| 8,708,285 B1 | 4/2014 | Carreiro | |
| 8,718,814 B1 * | 5/2014 | Clark | G06Q 10/08 700/214 |
| 8,724,282 B2 | 5/2014 | Hiremath | |
| 8,732,039 B1 | 5/2014 | Chen | |
| 8,744,626 B2 | 6/2014 | Johnson | |
| 8,751,042 B2 | 6/2014 | Lee | |
| 8,763,199 B2 | 7/2014 | Jones | |
| 8,770,976 B2 | 7/2014 | Moser | |
| 8,775,064 B2 | 7/2014 | Zeng | |
| 8,798,786 B2 * | 8/2014 | Wurman | B65F 3/00 700/214 |
| 8,798,840 B2 | 8/2014 | Fong | |
| 8,814,039 B2 | 8/2014 | Bishop | |
| 8,818,556 B2 | 8/2014 | Sanchez | |
| 8,820,633 B2 | 9/2014 | Bishop | |
| 8,825,226 B1 | 9/2014 | Worley, III | |
| 8,831,984 B2 | 9/2014 | Hoffman | |
| 8,838,268 B2 | 9/2014 | Friedman | |
| 8,843,244 B2 | 9/2014 | Phillips | |
| 8,851,369 B2 | 10/2014 | Bishop | |
| 8,882,432 B2 | 11/2014 | Bastian, II | |
| 8,886,390 B2 | 11/2014 | Wolfe | |
| 8,892,240 B1 | 11/2014 | Vliet | |
| 8,892,241 B2 | 11/2014 | Weiss | |
| 8,899,903 B1 | 12/2014 | Saad | |
| 8,918,202 B2 | 12/2014 | Kawano | |
| 8,918,230 B2 | 12/2014 | Chen | |
| 8,930,044 B1 | 1/2015 | Peeters | |
| 8,965,561 B2 | 2/2015 | Jacobus | |
| 8,972,045 B1 * | 3/2015 | Mountz | G06Q 10/087 700/213 |
| 8,972,061 B2 | 3/2015 | Rosenstein | |
| 8,983,647 B1 | 3/2015 | Dwarakanath | |
| 8,989,053 B1 | 3/2015 | Skaaksrud | |
| 9,002,506 B1 | 4/2015 | Agarwal | |

(56) References Cited

U.S. PATENT DOCUMENTS

| | | |
|---|---|---|
| 9,008,827 B1 | 4/2015 | Dwarakanath |
| 9,008,829 B2 | 4/2015 | Worsley |
| 9,014,848 B2 | 4/2015 | Farlow |
| 9,075,136 B1 | 7/2015 | Joao |
| 9,129,277 B2 | 9/2015 | MacIntosh |
| 9,170,117 B1 | 10/2015 | Abuelsaad |
| 9,173,816 B2 | 11/2015 | Reinhardt |
| 9,190,304 B2 | 11/2015 | MacKnight |
| 9,278,839 B2 | 3/2016 | Gilbride |
| 9,305,280 B1 | 4/2016 | Berg |
| 9,329,597 B2 | 5/2016 | Stoschek |
| 9,495,703 B1 | 11/2016 | Kaye |
| 9,534,906 B2 | 1/2017 | High |
| 9,550,577 B1 | 1/2017 | Beckman |
| 9,573,684 B2 | 2/2017 | Kimchi |
| 9,578,282 B1 | 2/2017 | Sills |
| 9,607,285 B1* | 3/2017 | Wellman ............... G06Q 10/087 |
| 9,623,923 B2 | 4/2017 | Riedel |
| 9,649,766 B2* | 5/2017 | Stubbs .................... B25J 9/1666 |
| 9,656,805 B1 | 5/2017 | Evans |
| 9,658,622 B2 | 5/2017 | Walton |
| 9,663,292 B1 | 5/2017 | Brazeau |
| 9,663,293 B2* | 5/2017 | Wurman ................... B65G 1/10 |
| 9,663,295 B1* | 5/2017 | Wurman ................ B65G 1/137 |
| 9,663,296 B1* | 5/2017 | Dingle ................. B65G 1/1373 |
| 9,747,480 B2 | 8/2017 | McAllister |
| 9,757,002 B2 | 9/2017 | Thompson |
| 9,801,517 B2 | 10/2017 | High |
| 9,827,678 B1 | 11/2017 | Gilbertson |
| 9,875,502 B2 | 1/2018 | Kay |
| 9,875,503 B2 | 1/2018 | High |
| 1,589,225 A1 | 2/2018 | High |
| 1,589,415 A1 | 2/2018 | High |
| 9,896,315 B2 | 3/2018 | High |
| 9,908,760 B2 | 3/2018 | High |
| 9,994,434 B2 | 6/2018 | High |
| 10,017,322 B2 | 7/2018 | High |
| 10,071,891 B2 | 9/2018 | High |
| 10,071,893 B2 | 9/2018 | High |
| 10,081,525 B2 | 9/2018 | High |
| 2001/0042024 A1 | 11/2001 | Rogers |
| 2002/0060542 A1 | 5/2002 | Song |
| 2002/0095342 A1 | 7/2002 | Feldman |
| 2002/0154974 A1* | 10/2002 | Fukuda ............ H01L 21/67294 414/416.01 |
| 2002/0156551 A1 | 10/2002 | Tackett |
| 2002/0165638 A1 | 11/2002 | Bancroft |
| 2002/0165643 A1 | 11/2002 | Bancroft |
| 2002/0165790 A1 | 11/2002 | Bancroft |
| 2002/0174021 A1 | 11/2002 | Chu |
| 2003/0028284 A1 | 2/2003 | Chirnomas |
| 2003/0152679 A1 | 8/2003 | Garwood |
| 2003/0170357 A1 | 9/2003 | Garwood |
| 2003/0185948 A1 | 10/2003 | Garwood |
| 2003/0222798 A1 | 12/2003 | Floros |
| 2004/0068348 A1 | 4/2004 | Jager |
| 2004/0081729 A1 | 4/2004 | Garwood |
| 2004/0093650 A1 | 5/2004 | Martins |
| 2004/0098167 A1 | 5/2004 | Yi |
| 2004/0117063 A1 | 6/2004 | Sabe |
| 2004/0146602 A1 | 7/2004 | Garwood |
| 2004/0216339 A1 | 11/2004 | Garberg |
| 2004/0217166 A1 | 11/2004 | Myers |
| 2004/0221790 A1 | 11/2004 | Sinclair |
| 2004/0225613 A1 | 11/2004 | Narayanaswami |
| 2004/0249497 A1 | 12/2004 | Saigh |
| 2005/0008463 A1 | 1/2005 | Stehr |
| 2005/0047895 A1 | 3/2005 | Lert |
| 2005/0072651 A1 | 4/2005 | Wieth |
| 2005/0080520 A1 | 4/2005 | Kline |
| 2005/0104547 A1 | 5/2005 | Wang |
| 2005/0149414 A1 | 7/2005 | Schrodt |
| 2005/0177446 A1 | 8/2005 | Hoblit |
| 2005/0216126 A1 | 9/2005 | Koselka |
| 2005/0222712 A1 | 10/2005 | Orita |
| 2005/0230472 A1 | 10/2005 | Chang |
| 2005/0238465 A1 | 10/2005 | Razumov |
| 2006/0107067 A1 | 5/2006 | Safal |
| 2006/0147087 A1 | 7/2006 | Goncalves |
| 2006/0163350 A1 | 7/2006 | Melton |
| 2006/0178777 A1 | 8/2006 | Park |
| 2006/0206235 A1* | 9/2006 | Shakes ................... G06Q 10/08 700/216 |
| 2006/0220809 A1* | 10/2006 | Stigall ................... G07B 15/00 340/438 |
| 2006/0221072 A1 | 10/2006 | Se |
| 2006/0231301 A1 | 10/2006 | Rose |
| 2006/0235570 A1 | 10/2006 | Jung |
| 2006/0241827 A1 | 10/2006 | Fukuchi |
| 2006/0244588 A1 | 11/2006 | Hannah |
| 2006/0279421 A1 | 12/2006 | French |
| 2006/0293810 A1 | 12/2006 | Nakamoto |
| 2007/0005179 A1 | 1/2007 | Mccrackin |
| 2007/0017855 A1 | 1/2007 | Pippin |
| 2007/0045018 A1 | 3/2007 | Carter |
| 2007/0061210 A1 | 3/2007 | Chen |
| 2007/0085682 A1 | 4/2007 | Murofushi |
| 2007/0125727 A1* | 6/2007 | Winkler ................... A47F 10/00 211/59.2 |
| 2007/0150368 A1 | 6/2007 | Arora |
| 2007/0152057 A1 | 7/2007 | Cato |
| 2007/0222679 A1 | 9/2007 | Morris |
| 2007/0269299 A1 | 11/2007 | Ross |
| 2007/0284442 A1 | 12/2007 | Herskovitz |
| 2007/0288123 A1* | 12/2007 | D'Andrea ............... B66F 9/063 700/214 |
| 2007/0293978 A1 | 12/2007 | Wurman |
| 2008/0011836 A1 | 1/2008 | Adema |
| 2008/0031491 A1 | 2/2008 | Ma |
| 2008/0041644 A1 | 2/2008 | Tudek |
| 2008/0042836 A1 | 2/2008 | Christopher |
| 2008/0075566 A1 | 3/2008 | Benedict |
| 2008/0075568 A1 | 3/2008 | Benedict |
| 2008/0075569 A1 | 3/2008 | Benedict |
| 2008/0077511 A1 | 3/2008 | Zimmerman |
| 2008/0105445 A1 | 5/2008 | Dayton |
| 2008/0131255 A1 | 6/2008 | Hessler |
| 2008/0140253 A1 | 6/2008 | Brown |
| 2008/0154720 A1 | 6/2008 | Gounares |
| 2008/0201227 A1 | 8/2008 | Bakewell |
| 2008/0226129 A1 | 9/2008 | Kundu |
| 2008/0267759 A1 | 10/2008 | Morency |
| 2008/0281515 A1 | 11/2008 | Ann |
| 2008/0281664 A1 | 11/2008 | Campbell |
| 2008/0294288 A1 | 11/2008 | Yamauchi |
| 2008/0306787 A1 | 12/2008 | Hamilton |
| 2008/0308630 A1 | 12/2008 | Bhogal |
| 2008/0314667 A1 | 12/2008 | Hannah |
| 2009/0074545 A1 | 3/2009 | Lert |
| 2009/0132250 A1 | 5/2009 | Chiang |
| 2009/0134572 A1 | 5/2009 | Obuchi |
| 2009/0138375 A1 | 5/2009 | Schwartz |
| 2009/0154708 A1 | 6/2009 | Kolar Sunder |
| 2009/0155033 A1 | 6/2009 | Olsen |
| 2009/0164902 A1 | 6/2009 | Cohen |
| 2009/0210536 A1 | 8/2009 | Allen |
| 2009/0240571 A1 | 9/2009 | Bonner |
| 2009/0259571 A1 | 10/2009 | Ebling |
| 2009/0265193 A1 | 10/2009 | Collins |
| 2009/0269173 A1 | 10/2009 | De Leo |
| 2009/0299822 A1 | 12/2009 | Harari |
| 2009/0319399 A1 | 12/2009 | Resta |
| 2010/0025964 A1 | 2/2010 | Fisk |
| 2010/0030417 A1 | 2/2010 | Fang |
| 2010/0076959 A1 | 3/2010 | Ramani |
| 2010/0138281 A1 | 6/2010 | Zhang |
| 2010/0143089 A1 | 6/2010 | Hvass |
| 2010/0171826 A1 | 7/2010 | Hamilton |
| 2010/0176922 A1 | 7/2010 | Schwab |
| 2010/0211441 A1 | 8/2010 | Sprigg |
| 2010/0222925 A1 | 9/2010 | Anezaki |
| 2010/0268697 A1 | 10/2010 | Karlsson |
| 2010/0295847 A1 | 11/2010 | Titus |
| 2010/0299065 A1 | 11/2010 | Mays |

(56) References Cited

U.S. PATENT DOCUMENTS

| | | | |
|---|---|---|---|
| 2010/0302102 A1 | 12/2010 | Desai | |
| 2010/0324773 A1 | 12/2010 | Choi | |
| 2011/0010023 A1 | 1/2011 | Kunzig | |
| 2011/0022201 A1 | 1/2011 | Reumerman | |
| 2011/0098920 A1 | 4/2011 | Chuang | |
| 2011/0153081 A1 | 6/2011 | Romanov | |
| 2011/0163160 A1 | 7/2011 | Zini | |
| 2011/0176803 A1 | 7/2011 | Song | |
| 2011/0225071 A1 | 9/2011 | Sano | |
| 2011/0240777 A1 | 10/2011 | Johns | |
| 2011/0258060 A1 | 10/2011 | Sweeney | |
| 2011/0260865 A1 | 10/2011 | Bergman | |
| 2011/0279252 A1* | 11/2011 | Carter | B60T 7/16 340/426.11 |
| 2011/0288684 A1 | 11/2011 | Farlow | |
| 2011/0288763 A1 | 11/2011 | Hui | |
| 2011/0295424 A1 | 12/2011 | Johnson | |
| 2011/0301757 A1 | 12/2011 | Jones | |
| 2011/0320034 A1 | 12/2011 | Dearlove | |
| 2011/0320322 A1 | 12/2011 | Roslak | |
| 2012/0000024 A1 | 1/2012 | Layton | |
| 2012/0029697 A1 | 2/2012 | Ota | |
| 2012/0035823 A1 | 2/2012 | Carter | |
| 2012/0046998 A1 | 2/2012 | Staib | |
| 2012/0059743 A1 | 3/2012 | Rao | |
| 2012/0072303 A1 | 3/2012 | Brown | |
| 2012/0134771 A1* | 5/2012 | Larson | B62B 3/02 414/800 |
| 2012/0143726 A1 | 6/2012 | Chirnomas | |
| 2012/0192260 A1 | 7/2012 | Kontsevich | |
| 2012/0226556 A1 | 9/2012 | Itagaki | |
| 2012/0239224 A1 | 9/2012 | McCabe | |
| 2012/0255810 A1 | 10/2012 | Yang | |
| 2012/0259732 A1 | 10/2012 | Sasankan | |
| 2012/0272500 A1 | 11/2012 | Reuteler | |
| 2012/0294698 A1 | 11/2012 | Villamar | |
| 2012/0303263 A1 | 11/2012 | Alam | |
| 2012/0303479 A1 | 11/2012 | Derks | |
| 2012/0330458 A1* | 12/2012 | Weiss | B66F 9/063 700/216 |
| 2013/0016011 A1 | 1/2013 | Harriman | |
| 2013/0026224 A1 | 1/2013 | Ganick | |
| 2013/0051667 A1 | 2/2013 | Deng | |
| 2013/0054052 A1 | 2/2013 | Waltz | |
| 2013/0054280 A1 | 2/2013 | Moshfeghi | |
| 2013/0060461 A1 | 3/2013 | Wong | |
| 2013/0073405 A1 | 3/2013 | Ariyibi | |
| 2013/0096735 A1 | 4/2013 | Byford | |
| 2013/0103539 A1 | 4/2013 | Abraham | |
| 2013/0105036 A1 | 5/2013 | Smith | |
| 2013/0110671 A1 | 5/2013 | Gray | |
| 2013/0141555 A1 | 6/2013 | Ganick | |
| 2013/0145572 A1 | 6/2013 | Schregardus | |
| 2013/0151335 A1 | 6/2013 | Avadhanam | |
| 2013/0155058 A1 | 6/2013 | Golparvar-Fard | |
| 2013/0174371 A1 | 7/2013 | Jones | |
| 2013/0181370 A1 | 7/2013 | Rafie | |
| 2013/0211953 A1 | 8/2013 | Abraham | |
| 2013/0218453 A1 | 8/2013 | Geelen | |
| 2013/0235206 A1 | 9/2013 | Smith | |
| 2013/0238130 A1 | 9/2013 | Dorschel | |
| 2013/0276004 A1 | 10/2013 | Boncyk | |
| 2013/0300729 A1 | 11/2013 | Grimaud | |
| 2013/0302132 A1* | 11/2013 | D'Andrea | G06Q 10/08 414/807 |
| 2013/0309637 A1 | 11/2013 | Minvielle | |
| 2013/0317642 A1 | 11/2013 | Asaria | |
| 2013/0333961 A1 | 12/2013 | Odonnell | |
| 2013/0338825 A1 | 12/2013 | Cantor | |
| 2014/0006229 A1 | 1/2014 | Birch | |
| 2014/0014470 A1 | 1/2014 | Razumov | |
| 2014/0032034 A1 | 1/2014 | Raptopoulos | |
| 2014/0032379 A1 | 1/2014 | Schuetz | |
| 2014/0037404 A1 | 2/2014 | Hancock | |
| 2014/0046512 A1 | 2/2014 | Villamar | |
| 2014/0058556 A1 | 2/2014 | Kawano | |
| 2014/0067564 A1 | 3/2014 | Yuan | |
| 2014/0081445 A1 | 3/2014 | Villamar | |
| 2014/0091013 A1 | 4/2014 | Streufert | |
| 2014/0100715 A1* | 4/2014 | Mountz | G06Q 10/087 701/2 |
| 2014/0100768 A1 | 4/2014 | Kessens | |
| 2014/0100769 A1* | 4/2014 | Wurman | G06Q 10/087 701/301 |
| 2014/0100998 A1* | 4/2014 | Mountz | G06Q 10/08 705/28 |
| 2014/0100999 A1* | 4/2014 | Mountz | G06Q 10/087 705/28 |
| 2014/0101690 A1 | 4/2014 | Boncyk | |
| 2014/0108087 A1 | 4/2014 | Fukui | |
| 2014/0124004 A1 | 5/2014 | Rosenstein | |
| 2014/0129054 A1 | 5/2014 | Huntzicker | |
| 2014/0133943 A1 | 5/2014 | Razumov | |
| 2014/0135984 A1 | 5/2014 | Hirata | |
| 2014/0143039 A1 | 5/2014 | Branton | |
| 2014/0149958 A1 | 5/2014 | Samadi | |
| 2014/0152507 A1 | 6/2014 | McAllister | |
| 2014/0156450 A1 | 6/2014 | Ruckart | |
| 2014/0156461 A1 | 6/2014 | Lerner | |
| 2014/0157156 A1 | 6/2014 | Kawamoto | |
| 2014/0164123 A1 | 6/2014 | Wissner-Gross | |
| 2014/0172197 A1 | 6/2014 | Ganz | |
| 2014/0172727 A1 | 6/2014 | Abhyanker | |
| 2014/0177907 A1 | 6/2014 | Argue | |
| 2014/0177924 A1 | 6/2014 | Argue | |
| 2014/0180478 A1 | 6/2014 | Letsky | |
| 2014/0180528 A1 | 6/2014 | Argue | |
| 2014/0180865 A1 | 6/2014 | Argue | |
| 2014/0180914 A1 | 6/2014 | Abhyanker | |
| 2014/0201041 A1 | 7/2014 | Meyer | |
| 2014/0207614 A1 | 7/2014 | Ramaswamy | |
| 2014/0209514 A1 | 7/2014 | Gitschel | |
| 2014/0211988 A1 | 7/2014 | Fan | |
| 2014/0214205 A1 | 7/2014 | Kwon | |
| 2014/0217242 A1 | 8/2014 | Muren | |
| 2014/0228999 A1 | 8/2014 | D'Andrea | |
| 2014/0229320 A1 | 8/2014 | Mohammed | |
| 2014/0244026 A1 | 8/2014 | Neiser | |
| 2014/0244207 A1 | 8/2014 | Hicks | |
| 2014/0246257 A1 | 9/2014 | Jacobsen | |
| 2014/0247116 A1 | 9/2014 | Davidson | |
| 2014/0250613 A1 | 9/2014 | Jones | |
| 2014/0254896 A1 | 9/2014 | Zhou | |
| 2014/0257928 A1 | 9/2014 | Chen | |
| 2014/0266616 A1 | 9/2014 | Jones | |
| 2014/0274309 A1 | 9/2014 | Nguyen | |
| 2014/0277693 A1 | 9/2014 | Naylor | |
| 2014/0277742 A1 | 9/2014 | Wells | |
| 2014/0277841 A1 | 9/2014 | Klicpera | |
| 2014/0285134 A1 | 9/2014 | Kim | |
| 2014/0289009 A1 | 9/2014 | Campbell | |
| 2014/0297090 A1 | 10/2014 | Ichinose | |
| 2014/0304107 A1 | 10/2014 | McAllister | |
| 2014/0306654 A1 | 10/2014 | Partovi | |
| 2014/0309809 A1 | 10/2014 | Dixon | |
| 2014/0330456 A1 | 11/2014 | LopezMorales et al. | |
| 2014/0330677 A1 | 11/2014 | Boncyk | |
| 2014/0344011 A1 | 11/2014 | Dogin | |
| 2014/0344118 A1 | 11/2014 | Parpia | |
| 2014/0350725 A1 | 11/2014 | LaFary | |
| 2014/0350851 A1 | 11/2014 | Carter | |
| 2014/0350855 A1 | 11/2014 | Vishnuvajhala | |
| 2014/0361077 A1* | 12/2014 | Davidson | G06Q 10/08 235/385 |
| 2014/0369558 A1 | 12/2014 | Holz | |
| 2014/0371912 A1 | 12/2014 | Passot | |
| 2014/0379588 A1 | 12/2014 | Gates | |
| 2015/0006319 A1 | 1/2015 | Thomas | |
| 2015/0029339 A1 | 1/2015 | Kobres | |
| 2015/0032252 A1 | 1/2015 | Galluzzo | |
| 2015/0045992 A1 | 2/2015 | Ashby | |
| 2015/0046299 A1 | 2/2015 | Yan | |
| 2015/0066283 A1 | 3/2015 | Wurman | |

(56) References Cited

U.S. PATENT DOCUMENTS

| | | |
|---|---|---|
| 2015/0073589 A1* | 3/2015 | Khodl .................... B25J 5/007 700/218 |
| 2015/0098775 A1 | 4/2015 | Razumov |
| 2015/0100439 A1 | 4/2015 | Lu |
| 2015/0100461 A1 | 4/2015 | Baryakar |
| 2015/0112826 A1 | 4/2015 | Crutchfield |
| 2015/0120094 A1 | 4/2015 | Kimchi |
| 2015/0123973 A1 | 5/2015 | Larsen |
| 2015/0142249 A1 | 5/2015 | Ooga |
| 2015/0203140 A1* | 7/2015 | Holtan .................... B60D 1/02 280/442 |
| 2015/0205298 A1 | 7/2015 | Stoschek |
| 2015/0205300 A1 | 7/2015 | Caver |
| 2015/0217449 A1 | 8/2015 | Meier |
| 2015/0217790 A1 | 8/2015 | Golden |
| 2015/0221854 A1 | 8/2015 | Melz |
| 2015/0228004 A1 | 8/2015 | Bednarek |
| 2015/0229906 A1* | 8/2015 | Inacio De Matos ........................ G05D 1/0246 348/46 |
| 2015/0231873 A1 | 8/2015 | Okamoto |
| 2015/0277440 A1 | 10/2015 | Kimchi |
| 2015/0278889 A1 | 10/2015 | Qian |
| 2015/0325128 A1 | 11/2015 | Lord |
| 2015/0336668 A1 | 11/2015 | Pasko |
| 2015/0360865 A1 | 12/2015 | Massey |
| 2016/0016731 A1 | 1/2016 | Razumov |
| 2016/0023675 A1 | 1/2016 | Hannah |
| 2016/0052139 A1 | 2/2016 | Hyde |
| 2016/0101794 A1 | 4/2016 | Fowler |
| 2016/0101936 A1* | 4/2016 | Chamberlin ........ G05B 19/402 700/214 |
| 2016/0110701 A1 | 4/2016 | Herring |
| 2016/0114488 A1 | 4/2016 | Mascorro Medina |
| 2016/0167557 A1 | 6/2016 | Mecklinger |
| 2016/0167577 A1 | 6/2016 | Simmons |
| 2016/0176638 A1 | 6/2016 | Toebes |
| 2016/0196755 A1 | 7/2016 | Navot |
| 2016/0207193 A1 | 7/2016 | Wise |
| 2016/0210602 A1 | 7/2016 | Siddique |
| 2016/0236867 A1 | 8/2016 | Brazeau |
| 2016/0255969 A1 | 9/2016 | High |
| 2016/0257212 A1 | 9/2016 | Thompson |
| 2016/0257240 A1 | 9/2016 | High |
| 2016/0257401 A1 | 9/2016 | Buchmueller |
| 2016/0258762 A1 | 9/2016 | Taylor |
| 2016/0258763 A1 | 9/2016 | High |
| 2016/0259028 A1 | 9/2016 | High |
| 2016/0259329 A1 | 9/2016 | High |
| 2016/0259331 A1 | 9/2016 | Thompson |
| 2016/0259339 A1 | 9/2016 | High |
| 2016/0259340 A1 | 9/2016 | Kay |
| 2016/0259341 A1 | 9/2016 | High |
| 2016/0259342 A1 | 9/2016 | High |
| 2016/0259343 A1* | 9/2016 | High .................... A47L 11/4011 |
| 2016/0259344 A1 | 9/2016 | High |
| 2016/0259345 A1 | 9/2016 | McHale |
| 2016/0259346 A1 | 9/2016 | High |
| 2016/0260049 A1 | 9/2016 | High |
| 2016/0260054 A1 | 9/2016 | High |
| 2016/0260055 A1 | 9/2016 | High |
| 2016/0260142 A1 | 9/2016 | Winkle |
| 2016/0260145 A1 | 9/2016 | High |
| 2016/0260148 A1 | 9/2016 | High |
| 2016/0260158 A1 | 9/2016 | High |
| 2016/0260159 A1 | 9/2016 | Atchley |
| 2016/0260161 A1 | 9/2016 | Atchley |
| 2016/0261698 A1 | 9/2016 | Thompson |
| 2016/0274586 A1* | 9/2016 | Stubbs ............... G06K 7/10366 |
| 2016/0288601 A1* | 10/2016 | Gehrke .................... B60D 1/36 |
| 2016/0300291 A1 | 10/2016 | Carmeli |
| 2016/0301698 A1 | 10/2016 | Katara |
| 2016/0325932 A1 | 11/2016 | Hognaland |
| 2016/0349754 A1 | 12/2016 | Mohr |
| 2016/0355337 A1* | 12/2016 | Lert .................... B65G 1/0492 |
| 2016/0364785 A1 | 12/2016 | Wankhede |
| 2016/0364786 A1 | 12/2016 | Wankhede |
| 2017/0009417 A1 | 1/2017 | High |
| 2017/0010608 A1 | 1/2017 | High |
| 2017/0010609 A1 | 1/2017 | High |
| 2017/0010610 A1 | 1/2017 | Atchley |
| 2017/0020354 A1 | 1/2017 | High |
| 2017/0024806 A1 | 1/2017 | High |
| 2017/0080846 A1 | 3/2017 | Lord |
| 2017/0107055 A1* | 4/2017 | Magens ................ G05D 1/021 |
| 2017/0110017 A1 | 4/2017 | Kimchi |
| 2017/0120443 A1 | 5/2017 | Kang |
| 2017/0129602 A1 | 5/2017 | Alduaiji |
| 2017/0137235 A1 | 5/2017 | Thompson |
| 2017/0148075 A1 | 5/2017 | High |
| 2017/0158430 A1 | 6/2017 | Raizer |
| 2017/0166399 A1 | 6/2017 | Stubbs |
| 2017/0176986 A1 | 6/2017 | High |
| 2017/0178066 A1 | 6/2017 | High |
| 2017/0178082 A1 | 6/2017 | High |
| 2017/0183159 A1 | 6/2017 | Weiss |
| 2017/0283171 A1 | 10/2017 | High |
| 2017/0355081 A1 | 12/2017 | Fisher |
| 2018/0020896 A1 | 1/2018 | High |
| 2018/0068357 A1 | 3/2018 | High |
| 2018/0075403 A1 | 3/2018 | Mascorro Medina |
| 2018/0099846 A1 | 4/2018 | High |
| 2018/0170729 A1 | 6/2018 | High |
| 2018/0170730 A1 | 6/2018 | High |

FOREIGN PATENT DOCUMENTS

| | | |
|---|---|---|
| CN | 100999277 | 7/2007 |
| CN | 102079433 | 6/2011 |
| CN | 202847767 | 4/2013 |
| CN | 103136923 | 5/2013 |
| CN | 103213115 | 7/2013 |
| CN | 203166399 | 8/2013 |
| CN | 203191819 | 9/2013 |
| CN | 203401274 | 1/2014 |
| CN | 203402565 | 1/2014 |
| CN | 103625808 | 3/2014 |
| CN | 203468521 | 3/2014 |
| CN | 103696393 | 4/2014 |
| CN | 103723403 | 4/2014 |
| CN | 203512491 | 4/2014 |
| CN | 103770117 | 5/2014 |
| CN | 203782622 | 8/2014 |
| CN | 104102188 | 10/2014 |
| CN | 104102219 | 10/2014 |
| CN | 102393739 | 12/2014 |
| CN | 204054062 | 12/2014 |
| CN | 204309852 | 12/2014 |
| CN | 204331404 | 5/2015 |
| CN | 105460051 | 4/2016 |
| DE | 102013013438 | 2/2015 |
| EP | 861415 | 5/1997 |
| EP | 1136052 | 9/2001 |
| EP | 0887491 | 4/2004 |
| EP | 1439039 | 7/2004 |
| EP | 1447726 | 8/2004 |
| EP | 2148169 | 1/2010 |
| EP | 2106886 | 3/2011 |
| EP | 2309487 | 4/2011 |
| EP | 2050544 | 8/2011 |
| EP | 2498158 | 9/2012 |
| EP | 2571660 | 3/2013 |
| EP | 2590041 | 5/2013 |
| EP | 2608163 | 6/2013 |
| EP | 2662831 | 11/2013 |
| EP | 2730377 | 5/2014 |
| EP | 2886020 | 6/2015 |
| FR | 2710330 | 3/1995 |
| GB | 1382806 | 2/1971 |
| GB | 2530626 | 3/2016 |
| GB | 2542472 | 3/2017 |
| GB | 2542905 | 5/2017 |
| JP | 62247458 | 10/1987 |

(56) References Cited

FOREIGN PATENT DOCUMENTS

| | | |
|---|---|---|
| JP | 10129996 | 5/1998 |
| JP | 2003288396 | 10/2003 |
| JP | 2005350222 | 12/2005 |
| JP | 2009284944 | 12/2009 |
| JP | 2010105644 | 5/2010 |
| JP | 2010231470 | 10/2010 |
| KR | 20120100505 A * | 9/2012 |
| WO | 8503277 A | 8/1985 |
| WO | 9603305 | 7/1995 |
| WO | 1997018523 | 5/1997 |
| WO | 9855903 | 12/1998 |
| WO | 2000061438 | 10/2000 |
| WO | 0132366 | 5/2001 |
| WO | 2004092858 | 10/2004 |
| WO | 2005102875 | 11/2005 |
| WO | 2006056614 | 6/2006 |
| WO | 2006120636 | 11/2006 |
| WO | 2006137072 | 12/2006 |
| WO | 2007007354 | 1/2007 |
| WO | 2007047514 | 4/2007 |
| WO | 2007149196 | 12/2007 |
| WO | 2008118906 | 10/2008 |
| WO | 2008144638 | 11/2008 |
| WO | 2008151345 | 12/2008 |
| WO | 2009022859 | 2/2009 |
| WO | 2009027835 | 3/2009 |
| WO | 2009103008 | 8/2009 |
| WO | 2011063527 | 6/2011 |
| WO | 2012075196 | 6/2012 |
| WO | 2013138193 | 9/2013 |
| WO | 2013138333 | 9/2013 |
| WO | 2013176762 | 11/2013 |
| WO | 2014022366 | 2/2014 |
| WO | 2014022496 | 2/2014 |
| WO | 2014045225 | 3/2014 |
| WO | 2014046757 | 3/2014 |
| WO | 2014101714 | 7/2014 |
| WO | 2014116947 | 7/2014 |
| WO | 2014138472 | 9/2014 |
| WO | 2014165286 | 10/2014 |
| WO | 2015021958 | 2/2015 |
| WO | 2015104263 | 7/2015 |
| WO | 2015155556 | 10/2015 |
| WO | 2016009423 | 1/2016 |
| WO | 2016015000 | 1/2016 |
| WO | 2016144765 | 9/2016 |

OTHER PUBLICATIONS

U.S. Appl. No. 15/060,953, filed Mar. 4, 2016, High.
U.S. Appl. No. 15/061,025, filed Mar. 4, 2016, High.
U.S. Appl. No. 15/061,054, filed Mar. 4, 2016, Kay.
U.S. Appl. No. 15/061,203, filed Mar. 4, 2016, High.
U.S. Appl. No. 15/061,265, filed Mar. 4, 2016, High.
U.S. Appl. No. 15/061,285, filed Mar. 4, 2016, High.
U.S. Appl. No. 15/061,325, filed Mar. 4, 2016, High.
U.S. Appl. No. 15/061,350, filed Mar. 4, 2016, Thompson.
U.S. Appl. No. 15/061,402, filed Mar. 4, 2016, High.
U.S. Appl. No. 15/061,406, filed Mar. 4, 2016, High.
U.S. Appl. No. 15/061,474, filed Mar. 4, 2016, High.
U.S. Appl. No. 15/061,671, filed Mar. 4, 2016, High.
U.S. Appl. No. 15/061,677, filed Mar. 4, 2016, Taylor.
U.S. Appl. No. 15/061,686, filed Mar. 4, 2016, High.
U.S. Appl. No. 15/061,688, filed Mar. 4, 2016, Thompson.
U.S. Appl. No. 15/061,722, filed Mar. 4, 2016, High.
U.S. Appl. No. 15/061,770, filed Mar. 4, 2016, Atchley.
U.S. Appl. No. 15/061,792, filed Mar. 4, 2016, Winkle.
U.S. Appl. No. 15/061,801, filed Mar. 4, 2016, High.
U.S. Appl. No. 15/061,805, filed Mar. 4, 2016, Atchley.
U.S. Appl. No. 15/061,844, filed Mar. 4, 2016, High.
U.S. Appl. No. 15/061,848, filed Mar. 4, 2016, McHale.
U.S. Appl. No. 15/061,908, filed Mar. 4, 2016, High.
U.S. Appl. No. 15/061,980, filed Mar. 4, 2016, Thompson.
Abbrobotics; "ABB Robotics—Innovative Packaging Solutions", https://www.youtube.com/watch?v=e5jif-IUvHY, published on May 16, 2013, pp. 1-5.
Ang, Fitzwatler, et al.; "Automated Waste Sorter With Mobile Robot Delivery Waste System", De La Salle University Research Congress 2013, Mar. 7-9, 2013, pp. 1-7.
Ansari, Sameer, et al.; "Automated Trash Collection & Removal in Office Cubicle Environments", Squad Collaborative Robots, Sep. 27, 2013, pp. 1-23.
Armstrong, Jean, et al.; "Visible Light Positioning: A Roadmap for International Standardization", IEEE Communications Magazine, Dec. 2013, pp. 2-7.
Artal, J.S., et al.; "Autonomous Mobile Robot with Hybrid PEM Fuel-Cell and Ultracapacitors Energy System, Dedalo 2.0", International Conference on Renewable Energies and Power Quality, Santiago de Compostela, Spain, Mar. 28-30, 2012, pp. 1-6.
Atherton, Kelsey D.; "New GPS Receiver Offers Navigation Accurate to an Inch", Popular Science, www.popsci.com/technology/article/2013-08/global-positioning-down-inches, Aug. 16, 2013, pp. 1-2.
Avezbadalov, Ariel, et al.; "Snow Shoveling Robot", engineering.nyu.edu/mechatronics/projects/ME3484/2006/Snow Shoveling Robot/Mechatronics Snow Robot Presentation Update 12-19-09.pdf, 2006, pp. 1-24.
Bares, John, et al.; "Designing Crash-Survivable Unmanned Vehicles", AUVSI Symposium, Jul. 10, 2002, pp. 1-15.
Bohren; Jonathan et al.; "Towards Autonomous Robotic Butlers: Lessons Learned with the PR2", Willow Garage, pp. 1-8.
Bouchard, Samuel; "A Robot to Clean Your Trash Bin!", Robotiq, http://blog.robotiq.com/bid/41203/A-Robot-to-Clean-your-Trash-Bin, Aug. 22, 2011, pp. 1-7.
Burns, Tom; "irobot roomba 780 review best robot vacuum floor cleaning robot review video demo", https://www.youtube.com/watch?v=MkwtIyVAaEY, published on Feb. 13, 2013, pp. 1-10.
Bytelight; "Scalable Indoor Location", http://www.bytelight.com/, Dec. 12, 2014, pp. 1-2.
Canadian Manufacturing; "Amazon unleashes army of order-picking robots", http://www.canadianmanufacturing.com/supply-chain/amazon-unleashes-army-order-picking-robots-142902/, Dec. 2, 2014, pp. 1-4.
Capel, Claudine; "Waste sorting—A look at the separation and sorting techniques in today's European market", Waste Management World, http://waste-management-world.com/a/waste-sorting-a-look-at-the-separation-and-sorting-techniques-in-todayrsquos-european-market, Jul. 1, 2008, pp. 1-8.
Carnegie Mellon Univeristy; "AndyVision—The Future of Retail", https:// www.youtube.com/watch?v=n5309ILTV2s, published on Jul. 16, 2012, pp. 1-9.
Carnegie Mellon University; "Robots in Retail", www.cmu.edu/homepage/computing/2012/summer/robots-in-retail.shmtl, 2012, pp. 1.
Chopade, Jayesh, et al.; "Control of Spy Robot by Voice and Computer Commands", International Journal of Advanced Research in Computer and Communication Engineering, vol. 2, Issue 4, Apr. 2013, pp. 1-3.
CNET; "iRobot Braava 380t—No standing ovation for this robotic floor mop", https://www.youtube.com/watch?v=JAtCIxFtC6Q, published on May 7, 2014, pp. 1-6.
Coltin, Brian & Ventura, Rodrigo; "Dynamic User Task Scheduling for Mobile Robots", Association for the Advancement of Artificial Intelligence, 2011, pp. 1-6.
Couceiro, Micael S., et al.; "Marsupial teams of robots: deployment of miniature robots for swarm exploration under communication constraints", Robotica, Cambridge University Press, downloaded Jan. 14, 2014, pp. 1-22.
Coxworth, Ben; "Robot designed to sort trash for recycling", Gizmag, http://www.gizmag.com/robot-sorts-trash-for-recycling/18426/, Apr. 18, 2011, pp. 1-7.
Davis, Jo; "The Future of Retail: In Store Now", Online Brands, http://onlinebrands.co.nz/587/future-retail-store-now/, Nov. 16, 2014, pp. 1-5.
Denso; "X-mobility", pp. 1.

(56) References Cited

OTHER PUBLICATIONS

DHL; "Self-Driving Vehicles in Logistics: A DHL perspective on implications and use cases for the logistics industry", 2014, pp. 1-39.
Dorrier, Jason; "Service Robots Will Now Assist Customers at Lowe's Store", SingularityHUB, http://singularityhub.com/2014/10/29/service-robots-will-now-assist-customers-at-lowes-store/, Oct. 29, 2014, pp. 1-4.
Dronewatch; "Weatherproof Drone XAircraft Has 'Black Box'", DroneWatch, http://www.dronewatch.nl/2015/02/13/weatherproof-drone-van-xaircraft-beschikt-over-zwarte-doos/, Feb. 13, 2015, pp. 1-5.
Dyson US; "See the new Dyson 360 Eye robot vacuum cleaner in action #DysonRobot", https://www.youtube.com/watch?v=OadhulCDAjk, published on Sep. 4, 2014, pp. 1-7.
Edwards, Lin; "Supermarket robot to help the elderly (w/Video)", Phys.Org, http://phys.org/news/2009-12-supermarket-robot-elderly-video.html, Dec. 17, 2009, pp. 1-5.
Elfes, Alberto; "Using Occupancy Grids for Mobile Robot Perception and Navigation", IEEE, 1989, pp. 46-57.
Elkins, Herschel T.; "Important 2014 New Consumer Laws", County of Los Angeles Department of Consumer Affairs Community Outreach & Education, updated Jan. 6, 2014, pp. 1-46.
Falconer, Jason; "HOSPI-R drug delivery robot frees nurses to do more important work", Gizmag, http://www.gizmag.com/panasonic-hospi-r-delivery-robot/29565/, Oct. 28, 2013, pp. 1-6.
Falconer, Jason; "Toyota unveils helpful Human Support Robot", Gizmag, http:/www.gizmag.com/toyota-human-support-robot/24246/, Sep. 22, 2012, pp. 1-6.
Farivar, Cyrus; "This in-store robot can show you the hammer aisle, but not the bathroom", Ars Technica, http://arstechnica.com/business/2014/12/this-in-store-robot-can-show-you-the-hammer-aisle-but-not-the-bathroom/, Dec. 3, 2014, pp. 1-4.
Fellow Robots; "Meet OSHBOT", http://fellowrobots.com/oshbot/, pp. 1-3.
Fellowrobots; "Oshbot Progress—Fellow Robots", https://vimeo.com/139532370, published Sep. 16, 2015, pp. 1-5.
Fora.tv; "A Day in the Life of a Kiva Robot", https://www.youtube.com/watch?v=6KRjuuEVEZs, published on May 11, 2011, pp. 1-11.
Gamma2Video; "FridayBeerBot.wmv", https://www.youtube.com/watch?v=KXXIIDYatxQ, published on Apr. 27, 2010, pp. 1-7.
Glas, Dylan F., et al.; "The Network Robot System: Enabling Social Human-Robot Interaction in Public Spaces", Journal of Human-Robot Interaction, vol. 1, No. 2, 2012, pp. 5-32.
Green, A., et al; "Report on evaluation of the robot trolley", CommRob IST-045441, Advanced Behaviour and High-Level Multimodal Communications with and among Robots, pp. 10-67.
Gross, H.-M., et al.; TOOMAS: Interactive Shopping Guide Robots in Everyday Use—Final Implementation and Experiences from Long-term Field Trials, Proc. IEEE/RJS Intern. Conf. on Intelligent Robots and Systems (IROS'09), St. Louis, USA, pp. 2005-2012.
Habib, Maki K., "Real Time Mapping and Dynamic Navigation for Mobile Robots", International Journal of Advanced Robotic Systems, vol. 4, No. 3, 2007, pp. 323-338.
HRJ3 Productions; "Japanese Automatic Golf Cart", https://www.youtube.com/watch?v=8diWYtqb6C0, published on Mar. 29, 2014, pp. 1-4.
Huang, Edward Y.C.; "A Semi-Autonomous Vision-Based Navigation System for a Mobile Robotic Vehicle", Thesis submitted to the Massachusetts Institute of Technology Department of Electrical Engineering and Computer Science on May 21, 2003, pp. 1-76.
IEEE Spectrum; "Warehouse Robots at Work", https://www.youtube.com/watch?v=IWsMdN7HMuA, published on Jul. 21, 2008, pp. 1-11.
Intelligent Autonomous Systems; "TUM James goes shopping", https://www.youtube.com/watch?v=JS2zycc4AUE, published on May 23, 2011, pp. 1-13.
Katic, M., Dusko; "Cooperative Multi Robot Systems for Contemporary Shopping Malls", Robotics Laboratory, Mihailo Pupin Institute, University of Belgrade, Dec. 30, 2010, pp. 10-17.
Kehoe, Ben, et al.; "Cloud-Based Robot Grasping with the Google Object Recognition Engine", 2013, pp. 1-7.
Kendricks, Cooper; "Trash Disposal Robot", https://prezi.com3 1acae05zf8i/trash-disposal-robot/, Jan. 9, 2015, pp. 1-7.
Kibria, Shafkat, "Speech Recognition for Robotic Control", Master's Thesis in Computing Science, Umea University, Dec. 18, 2005, pp. 1-77.
King, Rachael; "Newest Workers for Lowe's: Robots", The Wall Street Journal, http:/www.wsj.com/articles/newest-workers-for-lowes-robots-1414468866, Oct. 28, 2014, pp. 1-4.
Kitamura, Shunichi; "Super Golf Cart with Remote drive and NAVI system in Japan", https://www.youtube.com/watch?v-2_3-dUR12F8, published on Oct. 4, 2009, pp. 1-6.
Kiva Systems; "Automated Goods-to-Man Order Picking System—Kiva Systems", http://www.kivasystems.com/solutions/picking/, printed on Apr. 2, 2015, pp. 1-2.
Kiva Systems; "Frequently Asked Questions about Kiva Systems—Kiva Systems", http://kivasystems.com/about-us-the-kiva-approach/faq/, printed on Apr. 2, 2015, pp. 1-2.
Kiva Systems; "how a Kiva system makes use of the vertical space—Kiva Systems", http://www.kivasystems.com/solutions/vertical-storage/, printed on Apr. 2, 2015, pp. 1-2.
Kiva Systems; "How Kiva Systems and Warehouse Management Systems Interact", 2010, pp. 1-12.
Kiva Systems; "Kiva's warehouse automation system is the most powerful and flexible A . . . ", http://www.kivasystems.com/solutions/, printed on Apr. 2, 2015, pp. 1-2.
Kiva Systems; "Kiva replenishment is more productive and accurate than replenishing pick faces in traditional distribution operations", http//www.kivasystems.com/solutions/replenishment/, printed on Apr. 2, 2015, pp. 1-2.
Kiva Systems; "Kiva warehouse control software, Kiva WCS—Kiva Systems", http://www.kivasystems.com/solutions/software/, printed on Apr. 2, 2015, pp. 1-2.
Kiva Systems; "Shipping Sortation—Kiva Systems", http://www.kivasystems.com/solutions/shipping-sortation/, printed on Apr. 2, 2015, pp. 1-2.
Kohtsuka, Takafumi, et al.; "Design of a Control System for Robot Shopping Carts", Knowledge-Based and Intelligent Information and Engineering Systems, 15th International Conference, KES 2011, Kaiserslautern, Germany, Sep. 12-14, 2011, pp. 280-288.
Koubaa, Anis; "A Service-Oriented Architecture for Virtualizing Robots in Robot-as-a-Service Clouds", pp. 1-13.
Kumar, Swagat; "Robotics-as-a-Service: Transforming the Future of Retail", Tata Consultancy Services, http://www.tcs.com/resources/white_papers/Pages/Robolics-as-Service.aspx, printed on May 13, 2015, pp. 1-4.
Kumar Paradkar, Prashant; "Voice Controlled Robotic Project using interfacing of Andruino and Bluetooth HC-05", Robotics_Projects_C/C++_Android.
Lejepekov, Fedor; "Yuki-taro. Snow recycle robot.", https://www.youtube.com/watch?v=gl2j9PY4jGY, published on Jan. 17, 2011, pp. 1-4.
Liu, Xiaohan, et al.; "Design of an Indoor Self-Positioning System for the Visually Impaired—Simulation with RFID and Bluetooth in a Visible Light Communication System", Proceedings of the 29th Annual International Conference of the IEEE EMBS, Cite Internationale, Lyon, France, Aug. 23-26, 2007, pp. 1655-1658.
Lowe's Home Improvement; "OSHbots from Lowe's Innovation Labs", https://www.youtube.com/watch?v=W-RKAjP1dtA, published on Dec. 15, 2014, pp. 1-8.
Lowe's Innovation Labs; "Autonomous Retail Service Robots", http://www.lowesinnovationlabs.com/innovation-robots/, printed on Feb. 26, 2015, pp. 1-4.
Matos, Luis; "wi-Go—The autonomous and self-driven shopping cart"; https://www.indiegogo.com/projects/wi-go-the-autonomous-and-self-driven-shopping-cart; printed on Feb. 27, 2015, pp. 1-16.

(56) References Cited

OTHER PUBLICATIONS

Meena, M., & Thilagavahi, P.; "Automatic Docking System with Recharging and Battery Replacement for Surveillance Robot", International Journal of Electronics and Computer Science Engineering, pp. 1148-1154.
Murph, Darren; "B.O.S.S. shopping cart follows you around", Engadget, http://www.engadget.com/2006/08/11/b-o-s-s-shopping-cart-follows-you-around/, Aug. 11, 2006, pp. 1-4.
Nakajima, Madoka & Haruyama, Shinichiro; "New indoor navigation system for visually impaired people using visible light communication", EURASIP Journal on Wireless Communications and Networking, 2013, pp. 1-10.
Neurobtv; "Shopping Robot TOOMAS 2009", https://www.youtube.com/watch?v=49Pkm30qmQU, published on May 8, 2010, pp. 1-7.
Nickerson, S.B., et al.; "An autonomous mobile robot for known industrial environments", Autonomous Robot for a Known environment, Aug. 28, 1997, pp. 1-28.
O'Donnell, Jake; "Meet the Bluetooth-Connected Self-Following Robo-Caddy of the Future", Sportsgrid; http://www.sportsgrid.com/uncategorized/meet-the-bluetooth-connected-self-following-robo-caddy-of-the-future/, Apr. 22, 2014, pp. 1-5.
Ogawa, Keisuke; "Denso Demos In-wheel Motor System for Baby Carriages, Shopping Carts", Nikkei Technology, http://techon.nikkeiibp.co.jp/english/NEWS_EN/20141010/381880/?ST=english_PRINT, Oct. 10, 2014, pp. 1-2.
Orchard Supply Hardware; "Orchard Supply Hardware's OSHbot", https://www.youtube.com/watch?v=Sp9176vm7Co, published on Oct. 28, 2014, pp. 1-9.
Osborne, Charlie; "Smart Cart Follows You When Grocery Shopping", Smartplanet, http://www.smartplanet.com/blog/smart-takes/smart-cart-follows-you-when-grocery-shopping/, Feb. 29, 2012, pp. 1-4.
Poudel, Dev Bahadur; "Coordinating Hundreds of Cooperative, Autonomous Robots in a Warehouse", Jan. 27, 2013, pp. 1-13.
Robotlab Inc.; "NAO robot drives autonomously it's own car", https://www.youtube.com/watch?v=oBHYwYlo1UE, published on Sep. 8, 2014, pp. 1-6.
Rodriguez, Ashley; "Meet Lowe's Newest Sales Associate—OSHbot, the Robot", Advertising Age, http://adage.com/article/cmo-strategy/meet-lowe-s-newest-sales-associate-oshbot-robot/295591/, Oct. 28, 2014, pp. 1-8.
Sebaali, G., et al.; "Smart Shopping Cart", Department of Electrical and Computer Engineering, American University of Beirut, pp. 1-6.
Shukla, Neha; "SaviOne the Butler Bot: Service Robot for Hospitality Industry", TechieTonics, http://www.techietonics.com/robo-tonics/savione-the-butler-bot-service-for-hospitality-industry.html, pp. 1-5.
Song, Guangming, et al.; "Automatic Docking System for Recharging Home Surveillance Robots", http://www.academia.edu/6495007/Automatic_Docking_System_for_Recharging_Home_Surveillance_Robots, IEEE Transactions on Consumer Electronics, vol. 57, No. 2, May 2011, pp. 1-8.
Soper, Taylor; "Amazon vet's new robot-powered apparel startup aims to revolutionize how we buy clothes", GeekWire, http://www.geekwire.com/2012/hointer-robot-jeans-clothing-apparel-store-startup/, Nov. 29, 2012, pp. 1-12.
Stewart Golf; "Introducing the New Stewart Golf X9 Follow", https://www.youtube.com/watch?v=HHivFGtiuE, published on Apr. 9, 2014, pp. 1-9.
Sun, Eric; "Smart Bin & Trash Route" system—RMIT 2012 Green Inventors Competition, http://www.youtube.com/watch?v=OrTA57a1O0k, published on Nov. 14, 2012, pp. 1-8.
Superdroid Robots; "Cool Robots, Making Life Easier", http://www.superdroidrobots.com/shop/custom.aspx/cool-robots-making-life-easier/83/, printed on Jun. 16, 2015, pp. 1-7.
Swisslog; "RoboCourier Autonomous Mobile Robot", http://www.swisslog.com/en/Products/HCS/Automated-Material-Transport/RoboCourier-Autonomous-Mobile-Robot, pp. 1.

Tam, Donna; "Meet Amazon's busiest employee—the Kiva robot", CNET, http://www.cnet.com/news/meet-amazons-busiest-employee-the-kiva-robot/, Nov. 30, 2014, pp. 1-6.
Universal Robotics; "Neocortex Enables Random Part Handling and Automated Assembly", http://www.universalrobotics.com/random-bin-picking, printed on Dec. 22, 2015, pp.-1-3.
Uphigh Productions; "Behold the Future (E017 Robot Sales Assistant)", https://www.youtube.com/watch?v=8WbvjaPm7d4, published on Nov. 19, 2014, pp. 1-7.
Urankar, Sandeep, et al.; "Robo-Sloth: A Rope-Climbing Robot", Department of Mechanical Engineering, Indian Institute of Technology, 2003, pp. 1-10.
Vasilescu, Iuliu, et al.; "Autonomous Modular Optical Underwater Robot (AMOUR) Design, Prototype and Feasibility Study", pp. 1-7.
Vmecavacuumtech; "VMECA Magic Suction Cup with ABB robot for pick and place (packaging application)", https://www.youtube.com/watch?v=5btR9MLtGJA, published on Sep. 14, 2014, pp. 1-4.
Wang, Xuan; "2D Mapping Solutions for Low Cost Mobile Robot", Master's Thesis in Computer Science, Royal Institute of Technology, KTH CSC, Stockholm, Sweden, 2013, pp. 1-60.
Webb, Mick; "Robovie II—the personal robotic shopping", Gizmag, http://www.gizmag.com/robovie-ii-robotic-shopping-assistance/13664/, Dec. 23, 2009, pp. 1-5.
Weise, Elizabeth; "15,000 robots usher in Amazon's Cyber Monday", USATODAY, http://www.usatoday.com/story/tech/2014/12/01/robots-amazon.kiva-fulfillment-centers-cyber-monday/19725229/, Dec. 2, 2014, pp. 1-3.
Weiss, C.C.; "Multifunctional hybrid robot shovels snow and mows your lawn", Gizmag, http://www.gizmag.com/snowbyte-snow-shoveling-robot/32961/, Jul. 21, 2014, pp. 1-7.
Wikipedia; "Kiva Systems", http://en.wikipedia.org/wiki/Kiva_Systems, printed on Apr. 2, 2015, pp. 1-3.
Wired; "High-Speed Robots Part 1: Meet BettyBot in "Human Exclusion Zone" Warehouses—The Window-Wired", https://www.youtube.com/watch?v=8gy5tYVR-28, published on Jul. 2, 2013, pp. 1-6.
Wulf, O., et al.; "Colored 2D maps for robot navigation with 3D sensor data," Institute for Systems Engineering, University of Hannover, Hannover, Germany, 2014, pp. 1-6.
YRF; "The Diamond Robbery—Scene Dhoom:2 Hrithik Roshan", https://www.youtube.com/watch?v=3bMYgo_S0Kc, published on Jul. 12, 2012, pp. 1-7.
Kohtsuka, T. et al.; "Design of a Control System for Robot Shopping Carts"; KES'11 Proceedings of the 15th International Conference on Knowledge-Based and Intelligent Information and Engineering Systems; Sep. 12-14, 2011; pp. 280-288.
Nishimura, S. et al.; "Development of Attachable Modules for Robotizing Daily Items: Person Following Shopping Cart Robot"; Proceedings of the 2007 IEEE International Conference on Robotics and Biomimetics (Sanya, China); Dec. 14-18, 2007; pp. 1506-1511.
Scholz, J. et al.; "Cart Pushing with a Mobile Manipulation System: Towards Navigation with Moveable Objects"; Proceedings of the 2011 IEEE International Conference on Robotics and Automation (Shanghai, China); May 9-13, 2011; pp. 6115-6120.
UKIPO; App. No. 1703373.9; Office Action dated Aug. 31, 2017.
Bohren; Jonathan et al.; "Towards Autonomous Robotic Butlers: Lessons Learned with the PR2", Willow Garage, May 9, 2011, pp. 1-8.
Denso; "X-mobility", Oct. 10, 2014, pp. 1-2, including machine translation.
Fellow Robots; "Meet OSHBOT", http://fellowrobots.com/oshbot/, May 19, 2015, pp. 1-3.
Green, A., et al; "Report on evaluation of the robot trolley", CommRob IST-045441, Advanced Behaviour and High-Level Multimodal Communications with and among Robots, Jun. 14, 2010, pp. 10-67.
Koubaa, Anis; "A Service-Oriented Architecture for Virtualizing Robots in Robot-as-a-Service Clouds", 2014, pp. 1-13.
Kumar Paradkar, Prashant; "Voice Controlled Robotic Project using interfacing of Ardruino and Bluetooth HC-05", Robotics_Projects_C/C++_Android, Jan. 23, 2016, pp. 1-14.

(56) References Cited

OTHER PUBLICATIONS

Meena, M., & Thilagavathi, P.; "Automatic Docking System with Recharging and Battery Replacement for Surveillance Robot", International Journal of Electronics and Computer Science Engineering, 2012, pp. 1148-1154.
Sebaali, G., et al.; "Smart Shopping Cart", Department of Electrical and Computer Engineering, American University of Beirut, 2014, pp. 1-6.
Shukla, Neha; "SaviOne the Butler Bot: Service Robot for Hospitality Industry", TechieTonics, http://www.techietonics.com/robotonics/savione-the-butler-bot-service-for-hospitality-industry.html, Aug. 14, 2014, pp. 1-5.
Swisslog; "RoboCourier Autonomous Mobile Robot", http://www.swisslog.com/en/Products/ HCS/Automated-Material-Transport/ RoboCourier-Autonornous-Mobile-Robot printed May 27, 2015, pp. 1.
Vasilescu, Iuliu, et al.; "Autonomous Modular Optical Underwater Robot (AMOUR) Design, Prototype and Feasibility Study", Apr. 18, 2005, pp. 1-7.
Wikipedia; "Leeds Kirkgate Market"; https://en.wikipedia.org/wiki/ Leeds_Kirkgate_Market; Retrieved on Apr. 5, 2017; 8 pages.
Garun, Natt; "Hop the hands-free suitcase follows you around like an obedient pet"; https://www.digitaltrends.com/cool-tech/hop-the-hands-free-suitcase-follows-you-around-like-an-obedient-pet/; Oct. 10, 2012; pp. 1-6.
Onozato, Taishi et al.; "A Control System for the Robot Shopping Cart"; 2010 IRAST International Congress on Computer Applications and Computational Science (CACS 2010); 2010; pp. 907-910.
SK Telecom Co.; "SK Telecom Launches Smart Cart Pilot Test in Korea"; http://www.sktelecom.com/en/press/press_detail.do?idx= 971; Oct. 4, 2011; pp. 1-2.
Tam, Donna; "Meet Amazon's busiest employee—the Kiva robot"; http://www.cnet.com/news/meet-amazons-busiest-employee-the-kiva-robot/; Nov. 30, 2014; pp. 1-6.
Budgee; "The Robotic Shopping Cart Budgee "; https://www.youtube.com/watch?v=2dYNdVPF4VM; published on Mar. 20, 2015; pp. 1-6.
Follow Inspiration; "wiiGO"; https://www.youtube.com/watch?v= dhHXIdpknC4; published on Jun. 16, 2015; pp. 1-7.
Office Action dated Mar. 26, 2018 for U.S. Appl. No. 15/061,688 (pp. 1-18).
Technion; "Autonomous Tracking Shopping Cart—Shopping Made Easy from Technion"; https://www.youtube.com/watch?v= pQcb9fofmXg; published on Nov. 23, 2014; pp. 1-10.
UKIPO; App. No. 1714769.5; Office Action dated Mar. 27, 2018.
UKIPO; App. No. 1715523.5; Office Action dated Mar. 26, 2018.
UKIPO; App. No. GB1613851.3; Examination Report dated Feb. 9, 2018.
UKIPO; App. No. GB1721298.6; Office Action dated Jan. 31, 2018.
USPTO; U.S. Appl. No. 15/061,203; Notice of Allowance dated May 8, 2018 (pp. 1-5).
USPTO; U.S. Appl. No. 15/061,406; Notice of Allowance dated May 15, 2018 (pp. 1-5).
USPTO; U.S. Appl. No. 15/061,443; Office Action dated Apr. 4, 2018 (pp. 1-13).
USPTO; U.S. Appl. No. 15/061,671; Office Action dated Apr. 18, 2018 (pp. 1-18).
USPTO; U.S. Appl. No. 15/061,801; Notice of Allowance dated Mar. 2, 2018 (pp. 1-5).
USPTO; U.S. Appl. No. 15/274,991; Office Action dated May 17, 2018 (pp. 1-9).
USPTO; U.S. Appl. No. 15/282,951; Office Action dated Mar. 30, 2018 (pp. 1-12).
USPTO; U.S. Appl. No. 15/471,278; Notice of Allowance dated Apr. 19, 2018 (pp. 1-7).
USPTO; U.S. Appl. No. 15/061,350; Notice of Allowance dated Apr. 4, 2018 (pp. 1-8).
U.S. Appl. No. 15/698,068, filed Sep. 7, 2017, Donald R. High.
U.S. Appl. No. 15/902,274, filed May 25, 2018, Donald R. High.
U.S. Appl. No. 16/001,774, filed Jun. 6, 2018, Donald R. High.
U.S. Appl. No. 16/059,431, filed Aug. 9, 2018, Donald R. High.
U.S. Appl. No. 16/100,064, filed Aug. 9, 2018, Donald R. High.
U.S. Appl. No. 16/109,290, filed Aug. 22, 2018, Donald R. High.
UKIPO; App. No. GB1703373.9; Examination Report dated Aug. 31, 2018.
U.S. Appl. No. 15/061,443, filed Mar. 4, 2016, High.
U.S. Appl. No. 15/275,009, filed Sep. 23, 2016, Donald R. High.
U.S. Appl. No. 15/275,019, filed Sep. 23, 2016, Donald R. High.
U.S. Appl. No. 15/275,047, filed Sep. 23, 2016, Donald R. High.
U.S. Appl. No. 15/829,951, filed Sep. 30, 2016, Donald R. High.
U.S. Appl. No. 15/288,923, filed Oct. 7, 2016, Donald R. High.
U.S. Appl. No. 15/423,812, filed Feb. 3, 2017, Donald R. High.
U.S. Appl. No. 15/446,914, filed Mar. 1, 2017, Donald R. High.
U.S. Appl. No. 15/447,175, filed Mar. 2, 2017, Donald R. High.
U.S. Appl. No. 15/447,202, filed Mar. 2, 2017, Donald R. High.
U.S. Appl. No. 15/712,278, filed Mar. 28, 2017, Donald R. High.
U.S. Appl. No. 15/692,226, filed Aug. 31, 2017, Donald R. High.
U.S. Appl. No. 15/836,708, filed Dec. 8, 2017, Donald R. High.
Daily Mail; "Dancing with your phone: The gyrating robotic dock that can move along with your music", Sep. 12, 2012, http://www.dailymail.co.uk/sciencetech/article-2202164/The-intelligent-dancing-robot-controlled-mobile-phone.html, pp. 1-23.
Messieh, Nancy; "Humanoid robots will be roaming Abu Dhabi's malls next year", The Next Web, Oct. 17, 2011, https://thenextweb.com/me/2011/10/17/humanoid-robots-will-be-roaming-abu-dhabis-malls-next-year/, pp. 1-6.
Owano, Nancy; "HEARBO robot can tell beeps, notes, and spoken word (w/ Video)", Phys.org, Nov. 21, 2012, https://phys.org/news/ 2012-11-hearbo-robot-beeps-spoken-word.html, pp. 1-4.
Sales, Jorge, et al.; "CompaRob: The Shopping Cart Assistance Robot", International Journal of Distributed Sensor Networks, vol. 2016, Article ID 4781280, Jan. 3, 2016, http://dx.doi.org/10.1155/ 2016/4781280, pp. 1-16.

\* cited by examiner

MOTORIZED TRANSPORT UNIT WORKER SUPPORT SYSTEMS AND METHODS

RELATED APPLICATIONS

This application claims the benefit of each of the following U.S. Provisional applications, each of which is incorporated herein by reference in its entirety: U.S. Provisional Application No. 62/129,726, filed Mar. 6, 2015; U.S. Provisional Application No. 62/129,727, filed Mar. 6, 2015; U.S. Provisional Application No. 62/138,877, filed Mar. 26, 2015; U.S. Provisional Application No. 62/138,885, filed Mar. 26, 2015; U.S. Provisional Application No. 62/152,421, filed Apr. 24, 2015; U.S. Provisional Application No. 62/152,465, filed Apr. 24, 2015; U.S. Provisional Application No. 62/152,440, filed Apr. 24, 2015; U.S. Provisional Application No. 62/152,630, filed Apr. 24, 2015; U.S. Provisional Application No. 62/152,711, filed Apr. 24, 2015; U.S. Provisional Application No. 62/152,610, filed Apr. 24, 2015; U.S. Provisional Application No. 62/152,667, filed Apr. 24, 2015; U.S. Provisional Application No. 62/157,388, filed May 5, 2015; U.S. Provisional Application No. 62/165,579, filed May 22, 2015; U.S. Provisional Application No. 62/165,416, filed May 22, 2015; U.S. Provisional Application No. 62/165,586, filed May 22, 2015; U.S. Provisional Application No. 62/171,822, filed Jun. 5, 2015; U.S. Provisional Application No. 62/175,182, filed Jun. 12, 2015; U.S. Provisional Application No. 62/182,339, filed Jun. 19, 2015; U.S. Provisional Application No. 62/185,478, filed Jun. 26, 2015; U.S. Provisional Application No. 62/194,131, filed Jul. 17, 2015; U.S. Provisional Application No. 62/194,119, filed Jul. 17, 2015; U.S. Provisional Application No. 62/194,121, filed Jul. 17, 2015; U.S. Provisional Application No. 62/194,127, filed Jul. 17, 2015; U.S. Provisional Application No. 62/202,744, filed Aug. 7, 2015; U.S. Provisional Application No. 62/202,747, filed Aug. 7, 2015; U.S. Provisional Application No. 62/205,548, filed Aug. 14, 2015; U.S. Provisional Application No. 62/205,569, filed Aug. 14, 2015; U.S. Provisional Application No. 62/205,555, filed Aug. 14, 2015; U.S. Provisional Application No. 62/205,539, filed Aug. 14, 2015; U.S. Provisional Application No. 62/207,858, filed Aug. 20, 2015; U.S. Provisional Application No. 62/214,826, filed Sep. 4, 2015; U.S. Provisional Application No. 62/214,824, filed Sep. 4, 2015; U.S. Provisional Application No. 62/292,084, filed Feb. 5, 2016; U.S. Provisional Application No. 62/302,547, filed Mar. 2, 2016; U.S. Provisional Application No. 62/302,567, filed Mar. 2, 2016; U.S. Provisional Application No. 62/302,713, filed Mar. 2, 2016; and U.S. Provisional Application No. 62/303,021, filed Mar. 3, 2016.

TECHNICAL FIELD

These teachings relate generally to shopping environments and more particularly to devices, systems and methods for assisting workers and/or customers in those shopping environments.

BACKGROUND

In a modern retail store environment, there is a need to improve the customer experience and/or convenience for the customer. Whether shopping in a large format (big box) store or smaller format (neighborhood) store, customers often require assistance that employees of the store are not always able to provide. For example, particularly during peak hours, there may not be enough employees available to assist customers such that customer questions go unanswered. Additionally, due to high employee turnover rates, available employees may not be fully trained or have access to information to adequately support customers. Other routine tasks also are difficult to keep up with, particularly during peak hours. For example, shopping carts are left abandoned, aisles become messy, inventory is not displayed in the proper locations or is not even placed on the sales floor, shelf prices may not be properly set, and theft is hard to discourage. All of these issues can result in low customer satisfaction or reduced convenience to the customer. With increasing competition from non-traditional shopping mechanisms, such as online shopping provided by e-commerce merchants and alternative store formats, it can be important for "brick and mortar" retailers to focus on improving the overall customer experience and/or convenience.

BRIEF DESCRIPTION OF THE DRAWINGS

The above needs are at least partially met through provision of embodiments of systems, devices, and methods designed to provide assistance to workers and/or customers in a shopping facility, such as described in the following detailed description, particularly when studied in conjunction with the drawings, wherein.

Figure 1:
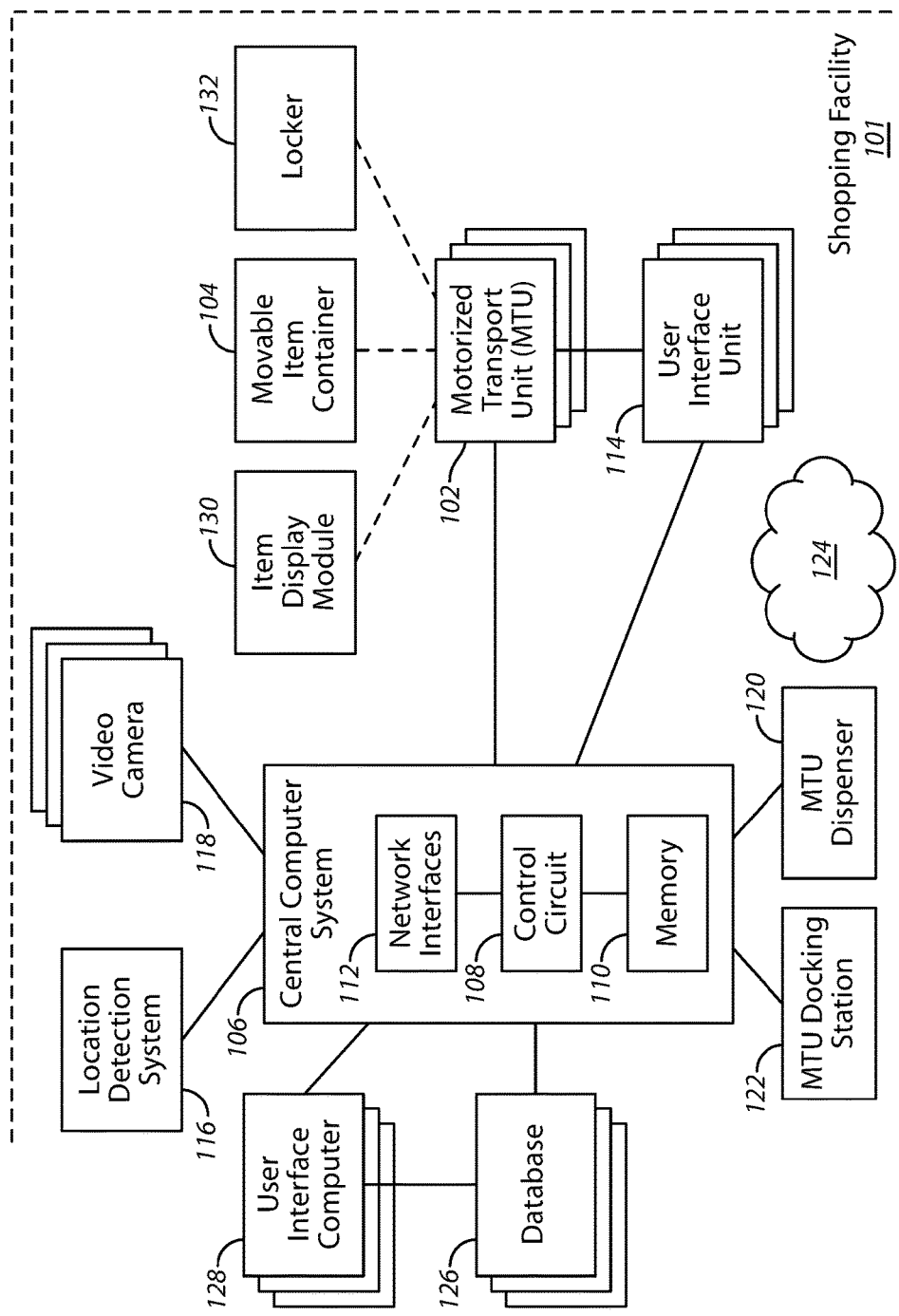
FIG. 1 comprises a block diagram of a shopping assistance system as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, systems, devices and methods are provided for assistance of persons at a shopping facility. Generally, assistance may be provided to customers or shoppers at the facility and/or to workers at the facility. The facility may be any type of shopping facility at a location in which products for display and/or for sale are variously distributed throughout the shopping facility space. The shopping facility may be a retail sales facility, or any other type of facility in which products are displayed and/or sold. The shopping facility may include one or more of sales floor areas, checkout locations, parking locations, entrance and exit areas, stock room areas, stock receiving areas, hallway areas, common areas shared by merchants, and so on. Generally, a shopping facility includes areas that may be dynamic in terms of the physical structures occupying the space or area and objects, items, machinery and/or persons moving in the area. For example, the shopping area may include product storage units, shelves, racks, modules, bins, etc., and other walls, dividers, partitions, etc. that may be configured in different layouts or physical arrangements. In other example, persons or other movable objects may be freely and independently traveling through the shopping facility space. And in other example, the persons or movable objects move according to known travel patterns and timing. The facility may be any size of format facility, and may include products from one or more merchants. For example, a facility may be a single store operated by one merchant or may be a collection of stores covering multiple merchants such as a mall. Generally, the system makes use of automated, robotic mobile devices, e.g., motorized transport units, that are capable of self-powered movement through a space of the shopping facility and providing any number of functions. Movement and operation of such devices may be controlled by a central computer system or may be autonomously controlled by the motorized transport units themselves. Various embodiments provide one or more user interfaces to allow various users to interact with the system including the automated mobile devices and/or to directly interact with the automated mobile devices. In some embodiments, the automated mobile devices and the corresponding system serve to enhance a customer shopping experience in the shopping facility, e.g., by assisting shoppers and/or workers at the facility.

In some embodiments, a shopping facility personal assistance system comprises: a plurality of motorized transport units located in and configured to move through a shopping facility space; a plurality of user interface units, each corresponding to a respective motorized transport unit during use of the respective motorized transport unit; and a central computer system having a network interface such that the central computer system wirelessly communicates with one or both of the plurality of motorized transport units and the plurality of user interface units, wherein the central computer system is configured to control movement of the plurality of motorized transport units through the shopping facility space based at least on inputs from the plurality of user interface units.

System Overview

Referring now to the drawings, FIG. 1 illustrates embodiments of a shopping facility assistance system 100 that can serve to carry out at least some of the teachings set forth herein. It will be understood that the details of this example are intended to serve in an illustrative capacity and are not necessarily intended to suggest any limitations as regards the present teachings. It is noted that generally, FIGS. 1-5 describe the general functionality of several embodiments of a system, and FIGS. 6-8 expand on some functionalities of some embodiments of the system and/or embodiments independent of such systems.

In the example of FIG. 1, a shopping assistance system 100 is implemented in whole or in part at a shopping facility 101. Generally, the system 100 includes one or more motorized transport units (MTUs) 102; one or more item containers 104; a central computer system 106 having at least one control circuit 108, at least one memory 110 and at least one network interface 112; at least one user interface unit 114; a location determination system 116; at least one video camera 118; at least one motorized transport unit (MTU) dispenser 120; at least one motorized transport unit (MTU) docking station 122; at least one wireless network 124; at least one database 126; at least one user interface computer device 128; an item display module 130; and a locker or an item storage unit 132. It is understood that more or fewer of such components may be included in different embodiments of the system 100.

These motorized transport units 102 are located in the shopping facility 101 and are configured to move throughout the shopping facility space. Further details regarding such motorized transport units 102 appear further below. Generally speaking, these motorized transport units 102 are configured to either comprise, or to selectively couple to, a corresponding movable item container 104. A simple example of an item container 104 would be a shopping cart as one typically finds at many retail facilities, or a rocket cart, a flatbed cart or any other mobile basket or platform that may be used to gather items for potential purchase.

In some embodiments, these motorized transport units 102 wirelessly communicate with, and are wholly or largely controlled by, the central computer system 106. In particular, in some embodiments, the central computer system 106 is configured to control movement of the motorized transport units 102 through the shopping facility space based on a variety of inputs. For example, the central computer system 106 communicates with each motorized transport unit 102 via the wireless network 124 which may be one or more wireless networks of one or more wireless network types (such as, a wireless local area network, a wireless personal area network, a wireless mesh network, a wireless star network, a wireless wide area network, a cellular network, and so on), capable of providing wireless coverage of the desired range of the motorized transport units 102 according to any known wireless protocols, including but not limited to a cellular, Wi-Fi, Zigbee or Bluetooth network.

By one approach the central computer system 106 is a computer based device and includes at least one control circuit 108, at least one memory 110 and at least one wired and/or wireless network interface 112. Such a control circuit 108 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here. This control circuit 108 is configured (for example, by using corresponding programming stored in the memory 110 as will be well understood by those skilled in the art) to carry out one or more of the steps, actions, and/or functions described herein.

In this illustrative example the control circuit 108 operably couples to one or more memories 110. The memory 110 may be integral to the control circuit 108 or can be physically discrete (in whole or in part) from the control circuit 108 as desired. This memory 110 can also be local with respect to the control circuit 108 (where, for example, both share a common circuit board, chassis, power supply, and/or housing) or can be partially or wholly remote with respect to the control circuit 108 (where, for example, the memory 110 is physically located in another facility, metropolitan area, or even country as compared to the control circuit 108).

This memory 110 can serve, for example, to non-transitorily store the computer instructions that, when executed by the control circuit 108, cause the control circuit 108 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

Additionally, at least one database 126 may be accessible by the central computer system 106. Such databases may be integrated into the central computer system 106 or separate from it. Such databases may be at the location of the shopping facility 101 or remote from the shopping facility 101. Regardless of location, the databases comprise memory to store and organize certain data for use by the central control system 106. In some embodiments, the at least one database 126 may store data pertaining to one or more of: shopping facility mapping data, customer data, customer shopping data and patterns, inventory data, product pricing data, and so on.

In this illustrative example, the central computer system 106 also wirelessly communicates with a plurality of user interface units 114. These teachings will accommodate a variety of user interface units including, but not limited to, mobile and/or handheld electronic devices such as so-called smart phones and portable computers such as tablet/pad-styled computers. Generally speaking, these user interface units 114 should be able to wirelessly communicate with the central computer system 106 via a wireless network, such as the wireless network 124 of the shopping facility 101 (such as a Wi-Fi wireless network). These user interface units 114 generally provide a user interface for interaction with the system. In some embodiments, a given motorized transport unit 102 is paired with, associated with, assigned to or otherwise made to correspond with a given user interface unit 114. In some embodiments, these user interface units 114 should also be able to receive verbally-expressed input from a user and forward that content to the central computer system 106 or a motorized transport unit 102 and/or convert that verbally-expressed input into a form useful to the central computer system 106 or a motorized transport unit 102.

By one approach at least some of the user interface units 114 belong to corresponding customers who have come to the shopping facility 101 to shop. By another approach, in lieu of the foregoing or in combination therewith, at least some of the user interface units 114 belong to the shopping facility 101 and are loaned to individual customers to employ as described herein. In some embodiments, one or more user interface units 114 are attachable to a given movable item container 104 or are integrated with the movable item container 104. Similarly, in some embodiments, one or more user interface units 114 may be those of shopping facility workers, belong to the shopping facility 101 and are loaned to the workers, or a combination thereof.

In some embodiments, the user interface units 114 may be general purpose computer devices that include computer programming code to allow it to interact with the system 106. For example, such programming may be in the form of an application installed on the user interface unit 114 or in the form of a browser that displays a user interface provided by the central computer system 106 or other remote computer or server (such as a web server). In some embodiments, one or more user interface units 114 may be special purpose devices that are programmed to primarily function as a user interface for the system 100. Depending on the functionality and use case, user interface units 114 may be operated by customers of the shopping facility or may be operated by workers at the shopping facility, such as facility employees (associates or colleagues), vendors, suppliers, contractors, etc.

By one approach, the system 100 optionally includes one or more video cameras 118. Captured video imagery from such a video camera 118 can be provided to the central computer system 106. That information can then serve, for example, to help the central computer system 106 determine a present location of one or more of the motorized transport units 102 and/or determine issues or concerns regarding automated movement of those motorized transport units 102 in the shopping facility space. As one simple example in these regards, such video information can permit the central computer system 106, at least in part, to detect an object in a path of movement of a particular one of the motorized transport units 102.

By one approach these video cameras 118 comprise existing surveillance equipment employed at the shopping facility 101 to serve, for example, various security purposes. By another approach these video cameras 118 are dedicated to providing video content to the central computer system 106 to facilitate the latter's control of the motorized transport units 102. If desired, the video cameras 118 can have a selectively movable field of view and/or zoom capability that the central computer system 106 controls as appropriate to help ensure receipt of useful information at any given moment.

In some embodiments, a location detection system 116 is provided at the shopping facility 101. The location detection system 116 provides input to the central computer system 106 useful to help determine the location of one or more of the motorized transport units 102. In some embodiments, the location detection system 116 includes a series of light sources (e.g., LEDs (light-emitting diodes)) that are mounted in the ceiling at known positions throughout the space and that each encode data in the emitted light that identifies the source of the light (and thus, the location of the light). As a given motorized transport unit 102 moves through the space, light sensors (or light receivers) at the motorized transport unit 102, on the movable item container 104 and/or at the user interface unit 114 receive the light and can decode the data. This data is sent back to the central computer system 106 which can determine the position of the motorized transport unit 102 by the data of the light it receives, since it can relate the light data to a mapping of the light sources to locations at the facility 101. Generally, such lighting systems are known and commercially available, e.g., the ByteLight system from ByteLight of Boston, Mass. In embodiments using a ByteLight system, a typical display screen of the typical smart phone device can be used as a light sensor or light receiver to receive and process data encoded into the light from the ByteLight light sources.

In other embodiments, the location detection system 116 includes a series of low energy radio beacons (e.g., Bluetooth low energy beacons) at known positions throughout the space and that each encode data in the emitted radio signal that identifies the beacon (and thus, the location of the beacon). As a given motorized transport unit 102 moves through the space, low energy receivers at the motorized transport unit 102, on the movable item container 104 and/or at the user interface unit 114 receive the radio signal and can decode the data. This data is sent back to the central computer system 106 which can determine the position of the motorized transport unit 102 by the location encoded in the radio signal it receives, since it can relate the location data to a mapping of the low energy radio beacons to locations at the facility 101. Generally, such low energy radio systems are known and commercially available. In embodiments using a Bluetooth low energy radio system, a typical Bluetooth radio of a typical smart phone device can be used as a receiver to receive and process data encoded into the Bluetooth low energy radio signals from the Bluetooth low energy beacons.

In still other embodiments, the location detection system 116 includes a series of audio beacons at known positions throughout the space and that each encode data in the emitted audio signal that identifies the beacon (and thus, the location of the beacon). As a given motorized transport unit 102 moves through the space, microphones at the motorized transport unit 102, on the movable item container 104 and/or at the user interface unit 114 receive the audio signal and can decode the data. This data is sent back to the central computer system 106 which can determine the position of the motorized transport unit 102 by the location encoded in the audio signal it receives, since it can relate the location data to a mapping of the audio beacons to locations at the facility 101. Generally, such audio beacon systems are known and commercially available. In embodiments using an audio beacon system, a typical microphone of a typical smart phone device can be used as a receiver to receive and process data encoded into the audio signals from the audio beacon.

Also optionally, the central computer system 106 can operably couple to one or more user interface computers 128 (comprising, for example, a display and a user input interface such as a keyboard, touch screen, and/or cursor-movement device). Such a user interface computer 128 can permit, for example, a worker (e.g., an associate, analyst, etc.) at the retail or shopping facility 101 to monitor the operations of the central computer system 106 and/or to attend to any of a variety of administrative, configuration or evaluation tasks as may correspond to the programming and operation of the central computer system 106. Such user interface computers 128 may be at or remote from the location of the facility 101 and may access one or more the databases 126.

In some embodiments, the system 100 includes at least one motorized transport unit (MTU) storage unit or dispenser 120 at various locations in the shopping facility 101. The dispenser 120 provides for storage of motorized transport units 102 that are ready to be assigned to customers and/or workers. In some embodiments, the dispenser 120 takes the form of a cylinder within which motorized transports units 102 are stacked and released through the bottom of the dispenser 120. Further details of such embodiments are provided further below. In some embodiments, the dispenser 120 may be fixed in location or may be mobile and capable of transporting itself to a given location or utilizing a motorized transport unit 102 to transport the dispenser 120, then dispense one or more motorized transport units 102.

In some embodiments, the system 100 includes at least one motorized transport unit (MTU) docking station 122. These docking stations 122 provide locations where motorized transport units 102 can travel and connect to. For example, the motorized transport units 102 may be stored and charged at the docking station 122 for later use, and/or may be serviced at the docking station 122.

In accordance with some embodiments, a given motorized transport unit 102 detachably connects to a movable item container 104 and is configured to move the movable item container 104 through the shopping facility space under control of the central computer system 106 and/or the user interface unit 114. For example, a motorized transport unit 102 can move to a position underneath a movable item container 104 (such as a shopping cart, a rocket cart, a flatbed cart, or any other mobile basket or platform), align itself with the movable item container 104 (e.g., using sensors) and then raise itself to engage an undersurface of the movable item container 104 and lift a portion of the movable item container 104. Once the motorized transport unit is cooperating with the movable item container 104 (e.g., lifting a portion of the movable item container), the motorized transport unit 102 can continue to move throughout the facility space 101 taking the movable item container 104 with it. In some examples, the motorized transport unit 102 takes the form of the motorized transport unit 202 of FIGS. 2A-3B as it engages and detachably connects to a given movable item container 104. It is understood that in other embodiments, the motorized transport unit 102 may not lift a portion of the movable item container 104, but that it removably latches to, connects to or otherwise attaches to a portion of the movable item container 104 such that the movable item container 104 can be moved by the motorized transport unit 102. For example, the motorized transport unit 102 can connect to a given movable item container using a hook, a mating connector, a magnet, and so on.

In addition to detachably coupling to movable item containers 104 (such as shopping carts), in some embodiments, motorized transport units 102 can move to and engage or connect to an item display module 130 and/or an item storage unit or locker 132. For example, an item display module 130 may take the form of a mobile display rack or shelving unit configured to house and display certain items for sale. It may be desired to position the display module 130 at various locations within the shopping facility 101 at various times. Thus, one or more motorized transport units 102 may move (as controlled by the central computer system 106) underneath the item display module 130, extend upward to lift the module 130 and then move it to the desired location. A storage locker 132 may be a storage device where items for purchase are collected and placed therein for a customer and/or worker to later retrieve. In some embodiments, one or more motorized transport units 102 may be used to move the storage locker to a desired location in the shopping facility 101. Similar to how a motorized transport unit engages a movable item container 104 or item display module 130, one or more motorized transport units 102 may move (as controlled by the central computer system 106) underneath the storage locker 132, extend upward to lift the locker 132 and then move it to the desired location.

Figure 2A:
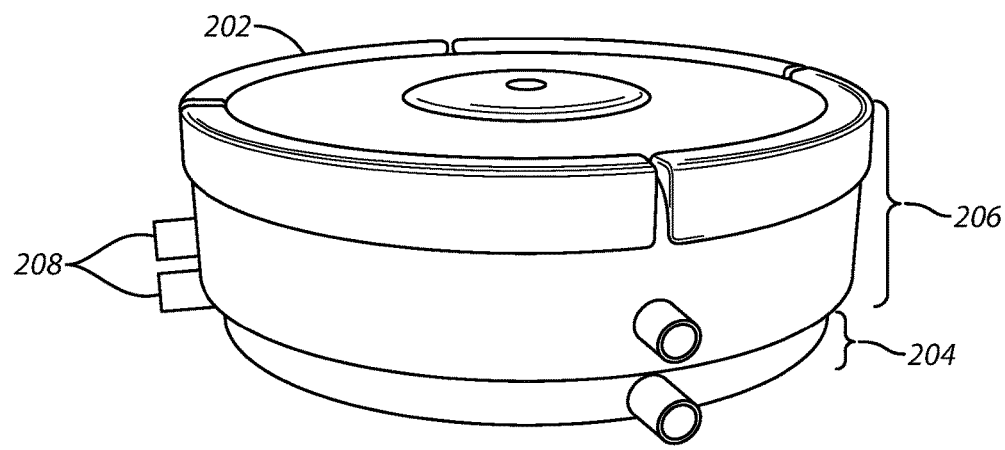
FIGS. 2A and 2B are illustrations of a motorized transport unit of the system of FIG. 1 in a retracted orientation and an extended orientation in accordance with some embodiments.
Figure 2B:
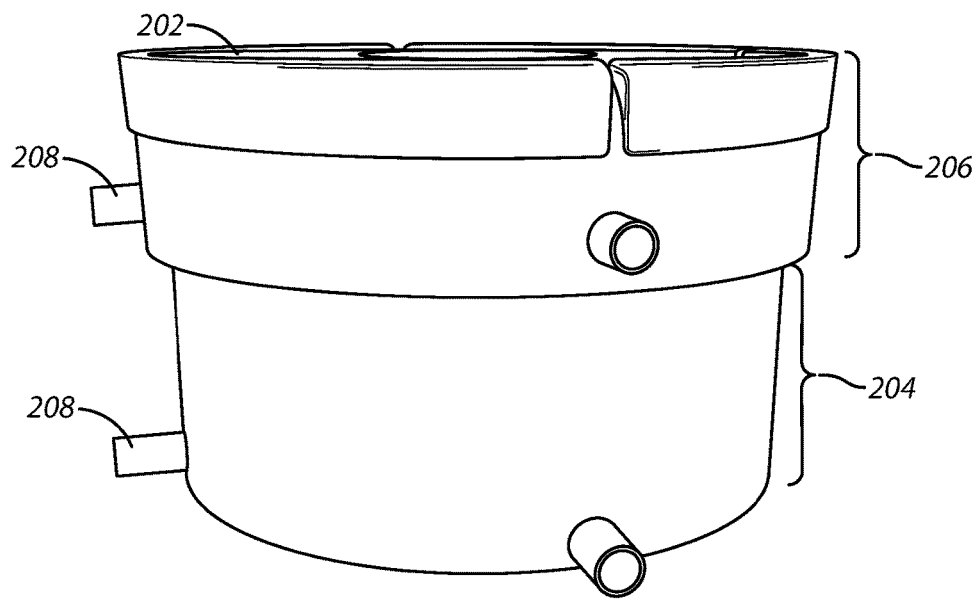

FIGS. 2A and 2B illustrate some embodiments of a motorized transport unit 202, similar to the motorized transport unit 102 shown in the system of FIG. 1. In this embodiment, the motorized transport unit 202 takes the form of a disc-shaped robotic device having motorized wheels (not shown), a lower body portion 204 and an upper body portion 206 that fits over at least part of the lower body portion 204. It is noted that in other embodiments, the motorized transport unit may have other shapes and/or configurations, and is not limited to disc-shaped. For example, the motorized transport unit may be cubic, octagonal, triangular, or other shapes, and may be dependent on a movable item container with which the motorized transport unit is intended to cooperate. Also included are guide members 208. In FIG. 2A, the motorized transport unit 202 is shown in a retracted position in which the upper body portion 206 fits over the lower body portion 204 such that the motorized transport unit 202 is in its lowest profile orientation which is generally the preferred orientation for movement when it is unattached to a movable item container 104 for example. In FIG. 2B, the motorized transport unit 202 is shown in an extended position in which the upper body portion 206 is moved upward relative to the lower body portion 204 such that the motorized transport unit 202 is in its highest profile orientation for movement when it is lifting and attaching to a movable item container 104 for example. The mechanism within the motorized transport unit 202 is designed to provide sufficient lifting force to lift the weight of the upper body portion 206 and other objects to be lifted by the motorized transport unit 202, such as movable item containers 104 and items placed within the movable item container, item display modules 130 and items supported by the item display module, and storage lockers 132 and items placed within the storage locker. The guide members 208 are embodied as pegs or shafts that extend horizontally from the both the upper body portion 206 and the lower body portion 204. In some embodiments, these guide members 208 assist docking the motorized transport unit 202 to a docking station 122 or a dispenser 120. In some embodiments, the lower body portion 204 and the upper body portion are capable to moving independently of each other. For example, the upper body portion 206 may be raised and/or rotated relative to the lower body portion 204. That is, one or both of the upper body portion 206 and the lower body portion 204 may move toward/away from the other or rotated relative to the other. In some embodiments, in order to raise the upper body portion 206 relative to the lower body portion 204, the motorized transport unit 202 includes an internal lifting system (e.g., including one or more electric actuators or rotary drives or motors). Numerous examples of such motorized lifting and rotating systems are known in the art. Accordingly, further elaboration in these regards is not provided here for the sake of brevity.

Figure 3A:
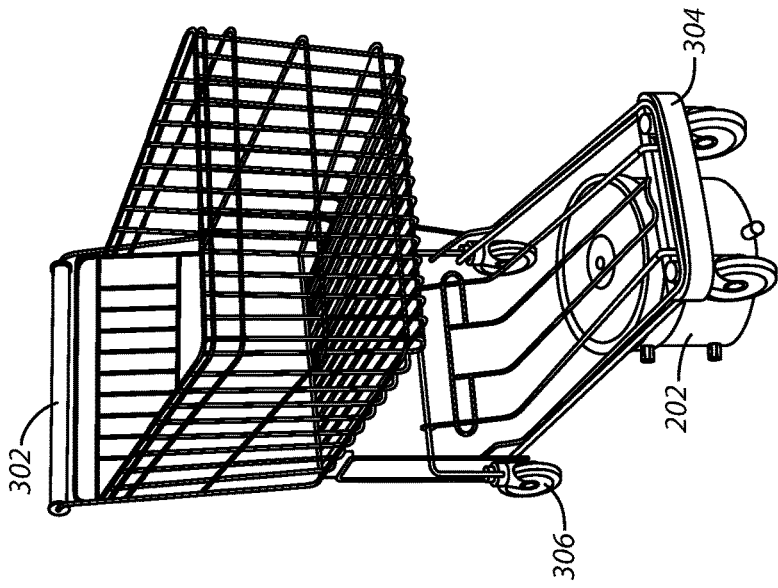
FIGS. 3A and 3B are illustrations of the motorized transport unit of FIGS. 2A and 2B detachably coupling to a movable item container, such as a shopping cart, in accordance with some embodiments.
Figure 3B:
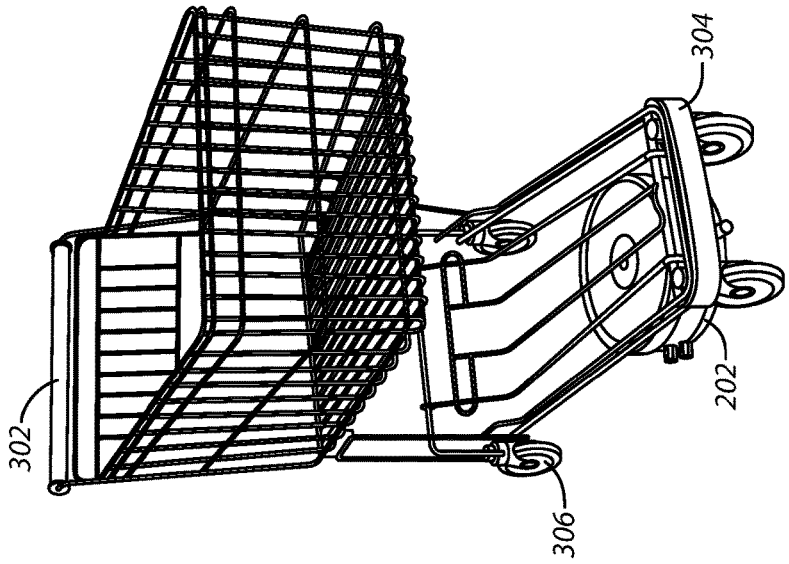

FIGS. 3A and 3B illustrate some embodiments of the motorized transport unit 202 detachably engaging a movable item container embodied as a shopping cart 302. In FIG. 3A, the motorized transport unit 202 is in the orientation of FIG. 2A such that it is retracted and able to move in position underneath a portion of the shopping cart 302. Once the motorized transport unit 202 is in position (e.g., using sensors), as illustrated in FIG. 3B, the motorized transport unit 202 is moved to the extended position of FIG. 2B such that the front portion 304 of the shopping cart is lifted off of the ground by the motorized transport unit 202, with the wheels 306 at the rear of the shopping cart 302 remaining on the ground. In this orientation, the motorized transport unit 202 is able to move the shopping cart 302 throughout the shopping facility. It is noted that in these embodiments, the motorized transport unit 202 does not bear the weight of the entire cart 302 since the rear wheels 306 rest on the floor. It is understood that in some embodiments, the motorized transport unit 202 may be configured to detachably engage other types of movable item containers, such as rocket carts, flatbed carts or other mobile baskets or platforms.

Figure 4:
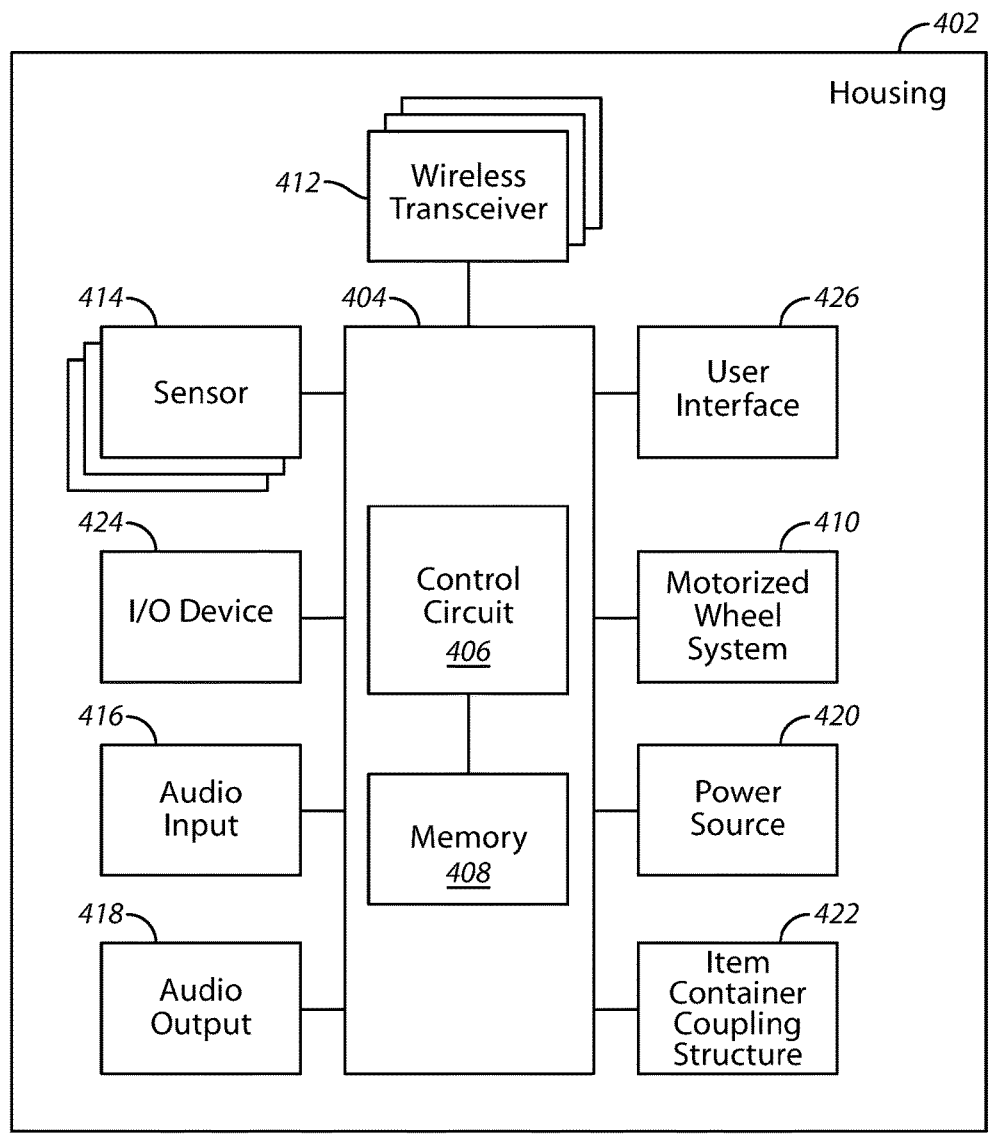
FIG. 4 comprises a block diagram of a motorized transport unit as configured in accordance with various embodiments of these teachings.

FIG. 4 presents a more detailed example of some embodiments of the motorized transport unit 102 of FIG. 1. In this example, the motorized transport unit 102 has a housing 402 that contains (partially or fully) or at least supports and carries a number of components. These components include a control unit 404 comprising a control circuit 406 that, like the control circuit 108 of the central computer system 106, controls the general operations of the motorized transport unit 102. Accordingly, the control unit 404 also includes a memory 408 coupled to the control circuit 406 and that stores, for example, operating instructions and/or useful data.

The control circuit 406 operably couples to a motorized wheel system 410. This motorized wheel system 410 functions as a locomotion system to permit the motorized transport unit 102 to move within the aforementioned retail or shopping facility 101 (thus, the motorized wheel system 410 may more generically be referred to as a locomotion system). Generally speaking, this motorized wheel system 410 will include at least one drive wheel (i.e., a wheel that rotates (around a horizontal axis) under power to thereby cause the motorized transport unit 102 to move through interaction with, for example, the floor of the shopping facility 101). The motorized wheel system 410 can include any number of rotating wheels and/or other floor-contacting mechanisms as may be desired and/or appropriate to the application setting.

The motorized wheel system 410 also includes a steering mechanism of choice. One simple example in these regards comprises one or more of the aforementioned wheels that can swivel about a vertical axis to thereby cause the moving motorized transport unit 102 to turn as well.

Numerous examples of motorized wheel systems are known in the art. Accordingly, further elaboration in these regards is not provided here for the sake of brevity save to note that the aforementioned control circuit 406 is configured to control the various operating states of the motorized wheel system 410 to thereby control when and how the motorized wheel system 410 operates.

In this illustrative example, the control circuit 406 also operably couples to at least one wireless transceiver 412 that operates according to any known wireless protocol. This wireless transceiver 412 can comprise, for example, a Wi-Fi-compatible and/or Bluetooth-compatible transceiver that can communicate with the aforementioned central computer system 106 via the aforementioned wireless network 124 of the shopping facility 101. So configured the control circuit 406 of the motorized transport unit 102 can provide information to the central computer system 106 and can receive information and/or instructions from the central computer system 106. As one simple example in these regards, the control circuit 406 can receive instructions from the central computer system 106 regarding movement of the motorized transport unit 102.

These teachings will accommodate using any of a wide variety of wireless technologies as desired and/or as may be appropriate in a given application setting. These teachings will also accommodate employing two or more different wireless transceivers 412 if desired.

The control circuit 406 also couples to one or more on-board sensors 414. These teachings will accommodate a wide variety of sensor technologies and form factors. By one approach at least one such sensor 414 can comprise a light sensor or light receiver. When the aforementioned location detection system 116 comprises a plurality of light emitters disposed at particular locations within the shopping facility 101, such a light sensor can provide information that the control circuit 406 and/or the central computer system 106 employs to determine a present location and/or orientation of the motorized transport unit 102.

As another example, such a sensor 414 can comprise a distance measurement unit configured to detect a distance between the motorized transport unit 102 and one or more objects or surfaces around the motorized transport unit 102 (such as an object that lies in a projected path of movement for the motorized transport unit 102 through the shopping facility 101). These teachings will accommodate any of a variety of distance measurement units including optical units and sound/ultrasound units. In one example, a sensor 414 comprises a laser distance sensor device capable of determining a distance to objects in proximity to the sensor. In some embodiments, a sensor 414 comprises an optical based scanning device to sense and read optical patterns in proximity to the sensor, such as bar codes variously located on structures in the shopping facility 101. In some embodiments, a sensor 414 comprises a radio frequency identification (RFID) tag reader capable of reading RFID tags in proximity to the sensor. Such sensors may be useful to determine proximity to nearby objects, avoid collisions, orient the motorized transport unit at a proper alignment orientation to engage a movable item container, and so on.

The foregoing examples are intended to be illustrative and are not intended to convey an exhaustive listing of all possible sensors. Instead, it will be understood that these teachings will accommodate sensing any of a wide variety of circumstances or phenomena to support the operating functionality of the motorized transport unit 102 in a given application setting.

By one optional approach an audio input 416 (such as a microphone) and/or an audio output 418 (such as a speaker) can also operably couple to the control circuit 406. So configured the control circuit 406 can provide a variety of audible sounds to thereby communicate with a user of the motorized transport unit 102, other persons in the vicinity of the motorized transport unit 102, or even other motorized transport units 102 in the area. These audible sounds can include any of a variety of tones and other non-verbal sounds. These audible sounds can also include, in lieu of the foregoing or in combination therewith, pre-recorded or synthesized speech.

The audio input 416, in turn, provides a mechanism whereby, for example, a user provides verbal input to the control circuit 406. That verbal input can comprise, for example, instructions, inquiries, or information. So configured, a user can provide, for example, a question to the motorized transport unit 102 (such as, "Where are the towels?"). The control circuit 406 can cause that verbalized question to be transmitted to the central computer system 106 via the motorized transport unit's wireless transceiver 412. The central computer system 106 can process that verbal input to recognize the speech content and to then determine an appropriate response. That response might comprise, for example, transmitting back to the motorized transport unit 102 specific instructions regarding how to move the motorized transport unit 102 (via the aforementioned motorized wheel system 410) to the location in the shopping facility 101 where the towels are displayed.

In this example the motorized transport unit 102 includes a rechargeable power source 420 such as one or more batteries. The power provided by the rechargeable power source 420 can be made available to whichever components of the motorized transport unit 102 require electrical energy. By one approach the motorized transport unit 102 includes a plug or other electrically conductive interface that the control circuit 406 can utilize to automatically connect to an external source of electrical energy to thereby recharge the rechargeable power source 420.

By one approach the motorized transport unit 102 comprises an integral part of a movable item container 104 such as a grocery cart. As used herein, this reference to "integral" will be understood to refer to a non-temporary combination and joinder that is sufficiently complete so as to consider the combined elements to be as one. Such a joinder can be facilitated in a number of ways including by securing the motorized transport unit housing 402 to the item container using bolts or other threaded fasteners as versus, for example, a clip.

These teachings will also accommodate selectively and temporarily attaching the motorized transport unit 102 to an item container 104. In such a case the motorized transport unit 102 can include a movable item container coupling structure 422. By one approach this movable item container coupling structure 422 operably couples to a control circuit 202 to thereby permit the latter to control, for example, the latched and unlatched states of the movable item container coupling structure 422. So configured, by one approach the control circuit 406 can automatically and selectively move the motorized transport unit 102 (via the motorized wheel system 410) towards a particular item container until the movable item container coupling structure 422 can engage the item container to thereby temporarily physically couple the motorized transport unit 102 to the item container. So latched, the motorized transport unit 102 can then cause the item container to move with the motorized transport unit 102. In embodiments such as illustrated in FIGS. 2A-3B, the movable item container coupling structure 422 includes a lifting system (e.g., including an electric drive or motor) to cause a portion of the body or housing 402 to engage and lift a portion of the item container off of the ground such that the motorized transport unit 102 can carry a portion of the item container. In other embodiments, the movable transport unit latches to a portion of the movable item container without lifting a portion thereof off of the ground.

In either case, by combining the motorized transport unit 102 with an item container, and by controlling movement of the motorized transport unit 102 via the aforementioned central computer system 106, these teachings will facilitate a wide variety of useful ways to assist both customers and associates in a shopping facility setting. For example, the motorized transport unit 102 can be configured to follow a particular customer as they shop within the shopping facility 101. The customer can then place items they intend to purchase into the item container that is associated with the motorized transport unit 102.

In some embodiments, the motorized transport unit 102 includes an input/output (I/O) device 424 that is coupled to the control circuit 406. The I/O device 424 allows an external device to couple to the control unit 404. The function and purpose of connecting devices will depend on the application. In some examples, devices connecting to the I/O device 424 may add functionality to the control unit 404, allow the exporting of data from the control unit 404, allow the diagnosing of the motorized transport unit 102, and so on.

In some embodiments, the motorized transport unit 102 includes a user interface 426 including for example, user inputs and/or user outputs or displays depending on the intended interaction with the user. For example, user inputs could include any input device such as buttons, knobs, switches, touch sensitive surfaces or display screens, and so on. Example user outputs include lights, display screens, and so on. The user interface 426 may work together with or separate from any user interface implemented at a user interface unit 114 (such as a smart phone or tablet device).

The control unit 404 includes a memory 408 coupled to the control circuit 406 and that stores, for example, operating instructions and/or useful data. The control circuit 406 can comprise a fixed-purpose hard-wired platform or can comprise a partially or wholly programmable platform. These architectural options are well known and understood in the art and require no further description here. This control circuit 406 is configured (for example, by using corresponding programming stored in the memory 408 as will be well understood by those skilled in the art) to carry out one or more of the steps, actions, and/or functions described herein. The memory 408 may be integral to the control circuit 406 or can be physically discrete (in whole or in part) from the control circuit 406 as desired. This memory 408 can also be local with respect to the control circuit 406 (where, for example, both share a common circuit board, chassis, power supply, and/or housing) or can be partially or wholly remote with respect to the control circuit 406. This memory 408 can serve, for example, to non-transitorily store the computer instructions that, when executed by the control circuit 406, cause the control circuit 406 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

It is noted that not all components illustrated in FIG. 4 are included in all embodiments of the motorized transport unit 102. That is, some components may be optional depending on the implementation.

Figure 5:
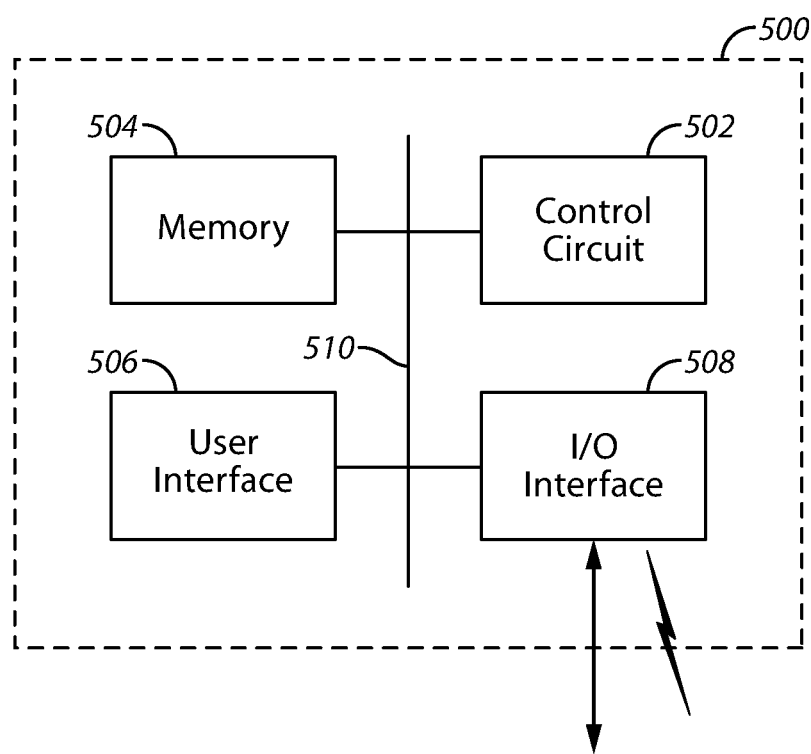
FIG. 5 comprises a block diagram of a computer device as configured in accordance with various embodiments of these teachings.

FIG. 5 illustrates a functional block diagram that may generally represent any number of various electronic components of the system 100 that are computer type devices. The computer device 500 includes a control circuit 502, a memory 504, a user interface 506 and an input/output (I/O) interface 508 providing any type of wired and/or wireless connectivity to the computer device 500, all coupled to a communication bus 510 to allow data and signaling to pass therebetween. Generally, the control circuit 502 and the memory 504 may be referred to as a control unit. The control circuit 502, the memory 504, the user interface 506 and the I/O interface 508 may be any of the devices described herein or as understood in the art. The functionality of the computer device 500 will depend on the programming stored in the memory 504. The computer device 500 may represent a high level diagram for one or more of the central computer system 106, the motorized transport unit 102, the user interface unit 114, the location detection system 116, the user interface computer 128, the MTU docking station 122 and the MTU dispenser 120, or any other device or component in the system that is implemented as a computer device.

Additional Features Overview

Referring generally to FIGS. 1-5, the shopping assistance system 100 may implement one or more of several different features depending on the configuration of the system and its components. The following provides a brief description of several additional features that could be implemented by the system. One or more of these features could also be implemented in other systems separate from embodiments of the system. This is not meant to be an exhaustive description of all features and not meant to be an exhaustive description of the details any one of the features. Further details with regards to one or more features beyond this overview may be provided herein.

Tagalong Steering: This feature allows a given motorized transport unit 102 to lead or follow a user (e.g., a customer and/or a worker) throughout the shopping facility 101. For example, the central computer system 106 uses the location detection system 116 to determine the location of the motorized transport unit 102. For example, LED smart lights (e.g., the ByteLight system) of the location detection system 116 transmit a location number to smart devices which are with the customer (e.g., user interface units 114), and/or on the item container 104/motorized transport unit 102. The central computer system 106 receives the LED location numbers received by the smart devices through the wireless network 124. Using this information, in some embodiments, the central computer system 106 uses a grid placed upon a 2D CAD map and 3D point cloud model (e.g., from the databases 126) to direct, track, and plot paths for the other devices. Using the grid, the motorized transport unit 102 can drive a movable item container 104 in a straight path rather than zigzagging around the facility. As the user moves from one grid to another, the motorized transport unit 102 drives the container 104 from one grid to the other. In some embodiments, as the user moves towards the motorized transport unit, it stays still until the customer moves beyond an adjoining grid.

Detecting Objects: In some embodiments, motorized transport units 102 detect objects through several sensors mounted on motorized transport unit 102, through independent cameras (e.g., video cameras 118), through sensors of a corresponding movable item container 104, and through communications with the central computer system 106. In some embodiments, with semi-autonomous capabilities, the motorized transport unit 102 will attempt to avoid obstacles, and if unable to avoid, it will notify the central computer system 106 of an exception condition. In some embodiments, using sensors 414 (such as distance measurement units, e.g., laser or other optical-based distance measurement sensors), the motorized transport unit 102 detects obstacles in its path, and will move to avoid, or stop until the obstacle is clear.

Visual Remote Steering: This feature enables movement and/or operation of a motorized transport unit 102 to be controlled by a user on-site, off-site, or anywhere in the world. This is due to the architecture of some embodiments where the central computer system 106 outputs the control signals to the motorized transport unit 102. These controls signals could have originated at any device in communication with the central computer system 106. For example, the movement signals sent to the motorized transport unit 102 may be movement instructions determined by the central computer system 106; commands received at a user interface unit 114 from a user; and commands received at the central computer system 106 from a remote user not located at the shopping facility space.

Determining Location: Similar to that described above, this feature enables the central computer system 106 to determine the location of devices in the shopping facility 101. For example, the central computer system 106 maps received LED light transmissions, Bluetooth low energy radio signals or audio signals (or other received signals encoded with location data) to a 2D map of the shopping facility. Objects within the area of the shopping facility are also mapped and associated with those transmissions. Using this information, the central computer system 106 can determine the location of devices such as motorized transport units.

Digital Physical Map Integration: In some embodiments, the system 100 is capable of integrating 2D and 3D maps of the shopping facility with physical locations of objects and workers. Once the central computer system 106 maps all objects to specific locations using algorithms, measurements and LED geo-location, for example, grids are applied which sections off the maps into access ways and blocked sections. Motorized transport units 102 use these grids for navigation and recognition. In some cases, grids are applied to 2D horizontal maps along with 3D models. In some cases, grids start at a higher unit level and then can be broken down into smaller units of measure by the central computer system 106 when needed to provide more accuracy.

Calling a Motorized Transport Unit: This feature provides multiple methods to request and schedule a motorized transport unit 102 for assistance in the shopping facility. In some embodiments, users can request use of a motorized transport unit 102 through the user interface unit 114. The central computer system 106 can check to see if there is an available motorized transport unit. Once assigned to a given user, other users will not be able to control the already assigned transport unit. Workers, such as store associates, may also reserve multiple motorized transport units in order to accomplish a coordinated large job.

Locker Delivery: In some embodiments, one or more motorized transport units 102 may be used to pick, pack, and deliver items to a particular storage locker 132. The motorized transport units 102 can couple to and move the storage locker to a desired location. In some embodiments, once delivered, the requestor will be notified that the items are ready to be picked up, and will be provided the locker location and locker security code key.

Route Optimization: In some embodiments, the central computer system automatically generates a travel route for one or more motorized transport units through the shopping facility space. In some embodiments, this route is based on one or more of a user provided list of items entered by the user via a user interface unit 114; user selected route preferences entered by the user via the user interface unit 114; user profile data received from a user information database (e.g., from one of databases 126); and product availability information from a retail inventory database (e.g., from one of databases 126). In some cases, the route intends to minimize the time it takes to get through the facility, and in some cases, may route the shopper to the least busy checkout area. Frequently, there will be multiple possible optimum routes. The route chosen may take the user by things the user is more likely to purchase (in case they forgot something), and away from things they are not likely to buy (to avoid embarrassment). That is, routing a customer through sporting goods, women's lingerie, baby food, or feminine products, who has never purchased such products based on past customer behavior would be non-productive, and potentially embarrassing to the customer. In some cases, a route may be determined from multiple possible routes based on past shopping behavior, e.g., if the customer typically buys a cold Diet Coke product, children's shoes or power tools, this information would be used to add weight to the best alternative routes, and determine the route accordingly.

Store Facing Features: In some embodiments, these features enable functions to support workers in performing store functions. For example, the system can assist workers to know what products and items are on the shelves and which ones need attention. For example, using 3D scanning and point cloud measurements, the central computer system can determine where products are supposed to be, enabling workers to be alerted to facing or zoning of issues along with potential inventory issues.

Phone Home: This feature allows users in a shopping facility 101 to be able to contact remote users who are not at the shopping facility 101 and include them in the shopping experience. For example, the user interface unit 114 may allow the user to place a voice call, a video call, or send a text message. With video call capabilities, a remote person can virtually accompany an in-store shopper, visually sharing the shopping experience while seeing and talking with the shopper. One or more remote shoppers may join the experience.

Returns: In some embodiments, the central computer system 106 can task a motorized transport unit 102 to keep the returns area clear of returned merchandise. For example, the transport unit may be instructed to move a cart from the returns area to a different department or area. Such commands may be initiated from video analytics (the central computer system analyzing camera footage showing a cart full), from an associate command (digital or verbal), or on a schedule, as other priority tasks allow. The motorized transport unit 102 can first bring an empty cart to the returns area, prior to removing a full one.

Bring a Container: One or more motorized transport units can retrieve a movable item container 104 (such as a shopping cart) to use. For example, upon a customer or worker request, the motorized transport unit 102 can reposition one or more item containers 104 from one location to another. In some cases, the system instructs the motorized transport unit where to obtain an empty item container for use. For example, the system can recognize an empty and idle item container that has been abandoned or instruct that one be retrieved from a cart storage area. In some cases, the call to retrieve an item container may be initiated through a call button placed throughout the facility, or through the interface of a user interface unit 114.

Respond to Voice Commands: In some cases, control of a given motorized transport unit is implemented through the acceptance of voice commands. For example, the user may speak voice commands to the motorized transport unit 102 itself and/or to the user interface unit 114. In some embodiments, a voice print is used to authorize to use of a motorized transport unit 102 to allow voice commands from single user at a time.

Retrieve Abandoned Item Containers: This feature allows the central computer system to track movement of movable item containers in and around the area of the shopping facility 101, including both the sale floor areas and the back-room areas. For example, using visual recognition through store cameras 118 or through user interface units 114, the central computer system 106 can identify abandoned and out-of-place movable item containers. In some cases, each movable item container has a transmitter or smart device which will send a unique identifier to facilitate tracking or other tasks and its position using LED geo-location identification. Using LED geo-location identification with the Determining Location feature through smart devices on each cart, the central computer system 106 can determine the length of time a movable item container 104 is stationary.

Stocker Assistance: This feature allows the central computer system to track movement of merchandise flow into and around the back-room areas. For example, using visual recognition and captured images, the central computer system 106 can determine if carts are loaded or not for moving merchandise between the back room areas and the sale floor areas. Tasks or alerts may be sent to workers to assign tasks.

Self-Docking: Motorized transport units 102 will run low or out of power when used. Before this happens, the motorized transport units 102 need to recharge to stay in service. According to this feature, motorized transport units 102 will self-dock and recharge (e.g., at a MTU docking station 122) to stay at maximum efficiency, when not in use. When use is completed, the motorized transport unit 102 will return to a docking station 122. In some cases, if the power is running low during use, a replacement motorized transport unit can be assigned to move into position and replace the motorized transport unit with low power. The transition from one unit to the next can be seamless to the user.

Item Container Retrieval: With this feature, the central computer system 106 can cause multiple motorized transport units 102 to retrieve abandoned item containers from exterior areas such as parking lots. For example, multiple motorized transport units are loaded into a movable dispenser, e.g., the motorized transport units are vertically stacked in the dispenser. The dispenser is moved to the exterior area and the transport units are dispensed. Based on video analytics, it is determined which item containers 104 are abandoned and for how long. A transport unit will attach to an abandoned cart and return it to a storage bay.

Motorized Transport Unit Dispenser: This feature provides the movable dispenser that contains and moves a group of motorized transport units to a given area (e.g., an exterior area such as a parking lot) to be dispensed for use. For example, motorized transport units can be moved to the parking lot to retrieve abandoned item containers 104. In some cases, the interior of the dispenser includes helically wound guide rails that mate with the guide member 208 to allow the motorized transport units to be guided to a position to be dispensed.

Specialized Module Retrieval: This feature allows the system 100 to track movement of merchandise flow into and around the sales floor areas and the back-room areas including special modules that may be needed to move to the sales floor. For example, using video analytics, the system can determine if a modular unit it loaded or empty. Such modular units may house items that are of seasonal or temporary use on the sales floor. For example, when it is raining, it is useful to move a module unit displaying umbrellas from a back room area (or a lesser accessed area of the sales floor) to a desired area of the sales floor area.

Authentication: This feature uses a voice imprint with an attention code/word to authenticate a user to a given motorized transport unit. One motorized transport unit can be swapped for another using this authentication. For example, a token is used during the session with the user. The token is a unique identifier for the session which is dropped once the session is ended. A logical token may be a session id used by the application of the user interface unit 114 to establish the session id when user logs on and when deciding to do use the system 100. In some embodiments, communications throughout the session are encrypted using SSL or other methods at transport level.

Further Details of Some Embodiments

Some embodiments provide systems to at least in part assist, enhance and/or enable product stocking on a sales floor of a retail shopping facility. Typically, the sales floor comprises the area of a shopping facility where customers travel in shopping for products. The system includes a plurality of motorized transport units 102 that are each configured to perform multiple different types of tasks at a retail shopping facility. As described above, the different tasks can vary from, but not limited to, assisting customers, performing a clean-up, collecting one or more movable item containers, and other such tasks. Further, the motorized transport units can assist with stocking products on the sales floor, in part by transporting stocking carts carrying products to be stocked on the sales floor. A central computer system 106 is in communication with the motorized transport units and is configured to coordinate the plurality of motorized transport units 102 in performing the multiple different tasks. In some applications, the central computer system instructs one or more motorized transport units to retrieve a specified stocking movable item container 104, which is referred to below as a stocking cart. The stocking cart is configured to carry a plurality of products that are to be restocked onto one or more product supports (e.g., shelves, racks, modulars, etc.) that are positioned on the sales floor and/or product supports in a back storage area, overflow area, or the like. The stocking cart is intended to be used by workers to transport products to the sales floor so that workers can restock the product supports from the products carried by the stocking cart.

In some applications, the stocking cart may be a specific stocking cart and/or have a specific coupling structure with which a motorized transport unit can cooperate. The central computer system can further instruct the one or more motorized transport units to autonomously transport the specified stocking cart to a specified stocking location on the sales floor corresponding to at least one of the plurality of products carried by the stocking cart and intended to be restocked at or near the stocking location.

Typically, the control circuit 108 of the central computer system 106 can obtain location information for each of the motorized transport units 102. Similarly, the central computer system can obtain location information of one or more stocking carts. For example, a stocking cart may include a stocking cart control circuit and transceiver that can communicate location information to the central computer system. Additionally or alternatively, a worker can notify the central computer system when a stocking cart is being loaded and/or has completed a loading of a stocking cart, and can provide relevant location information. The stocking cart may determine and/or track its location similar to the motorized transport unit tracking its movement and location (e.g., detection of encoded location information emitted by one or more light sources, detecting one or more beacons, triangulation of beacons, Wi-Fi, cellular or other signals, inertial sensors, distance measurement sensors, distance travel detection systems, global positioning satellite information, information from a user interface unit, other such sources, or a combination of two or more of such sources. Similarly, the central computer system may task one or more workers to perform the task of loading one or more stocking carts, and the central computer system may track the location of the workers as they load the stocking carts, and determine a location of one or more stocking carts based on the movements of the workers. The workers' locations may be determined based on information communicated from a user interface unit 114, video processing, and the like.

The stocking location is typically dependent on the products loaded in the stocking cart. Further, in some instances, the stocking location and/or the products instructed to be loaded into and/or onto the stocking cart are dependent on one or more products the central computer system has been notified of and/or determines are in need of being restocked. Additionally, the stocking location may further be dependent on a location of a worker who has been tasked with restocking the one or more products in or on the stocking cart. Accordingly, the central computer system may direct an motorized transport unit to cooperate with and transport a stocking cart in response to identifying that a worker is at or moving toward a tasked stocking location (e.g., by tracking a user interface unit 114 associated with the worker, using image recognition to track the worker, receiving a notification from the worker acknowledging starting of the stocking task, other such methods, or combination of two or more of such methods).

The one or more instructions communicated to the motorized transport unit to autonomously transport one or more stocking carts can include routing instructions based on a mapping of the retail shopping facility, the starting location of the stocking cart, and the intended stocking location. Using the routing instructions, the motorized transport unit 102 can autonomously transport the stocking cart to the specified stocking location. In some instances, the motorized transport unit includes a stocking cart coupler, which may be the same as or similar to the item container coupling structure 422. Further, some shopping facilities may have different types of stocking carts, which may be intended for different types of products. These different types of stocking carts may include different types of couplers with which the motorized transport unit is expected to couple to be able to transport the stocking cart. In some embodiments, the central computer system 106 is further configured to identify a type of mating coupler on a stocking cart with which one of the motorized transport units is to couple in transporting the stocking cart. For example, the stocking cart may be and/or include a pallet jack, where the mating coupler is configured to allow the motorized transport unit to cause the pallet jack to at least partially lift the products and/or one or more pallets of products. In other instances, a stocking cart may be similar to or may be a shopping cart and the motorized transport unit may be intended to move in under at least a portion of the stocking cart and cooperate with one or more bars, latches or other such mating coupler with which an motorized transport unit can couple.

The central computer system can identify, from the plurality of motorized transport units, one or more motorized transport units that comprise one or more couplers that are consistent with the type of mating coupler on the stocking cart. Based at least in part on identifying one or more motorized transport units that comprise the coupler consistent with the type of mating coupler on the stocking cart the central computer system can select one or more of the identified motorized transport units and direct the one or more motorized transport units to one or more stocking carts. Accordingly, the central computer system can select a motorized transport unit having a correct coupler to cooperate with and move the specific stocking cart. Further, one or more motorized transport units at the shopping facility may be incapable of coupling with a stocking cart and are not considered by the central computer system in selecting a motorized transport unit to transport the stocking cart. The central computer system may take into consideration other factors, such as but not limited to tasks that an motorized transport unit has already been assigned, availability of other motorized transport units that can couple with the stocking cart, availability of one or more other motorized transport units to which one or more tasks can be reassigned freeing up a particular motorized transport unit, a location of the one or more motorized transport units relative to the stocking cart, a distance an motorized transport unit has to travel, a distance through the sales floor an motorized transport unit has to travel, a battery charge levels of an motorized transport unit, other such factors, and typically a combination of two or more of such factors.

Some embodiments may further confirm correct products to be stocked are on or in the stocking cart. In some instances, the central computer system receives sensor data indicative of a weight of the stocking cart and the plurality of products carried by the stocking cart. For example, the central computer system may receive sensor data from the motorized transport unit 102 that is directed to transport a specified stocking cart. Additionally or alternatively, the stocking cart may include one or more sensors that can detect weight, distributed weight, temperature, or the like. For example, the stocking cart may include an array of piezoelectric elements on the stocking cart that can detect weight and/or weight variations. Temperature sensors can detect when and/or where some products may be placed in or on the stocking cart. Further, some embodiments may use image and/or video processing over time to detect products and/or whether a stocking cart includes all of the intended products to be stocked from the stocking cart. This weight information may be communicated to the central computer system. In other embodiments, the motorized transport unit tasked to move the stocking car may determine an estimated weight. For example, the motorized transport unit may estimate weight based on forces used to initiate movement and/or maintain movement of the stocking cart. The central computer system can then confirm based on the sensor data that an expected plurality of products is carried by the stocking cart.

The motorized transport unit is configured to autonomously transport the stocking cart to a specified stocking location on the sales floor corresponding to at least one of the first plurality of products carried by the first stocking cart. In some implementations, the central computer system communicates one or more routing instructions to the motorized transport unit that the motorized transport unit implements to move the stocking cart. The motorized transport unit typically includes one or more sensors that can be used to determine and/or confirm a location, track movement of the motorized transport unit and/or the stocking cart, detect distances between the motorized transport unit and/or stocking cart and other elements in the shopping facility (e.g., shelves, racks, movable item containers, customers, workers, other stocking carts, pallets, pallet jacks, fork lifts, boxes, products, and other such elements).

In some embodiments, the motorized transport unit can detect, through one or more sensors on the motorized transport unit, a customer or other element on the sales floor and within a threshold distance of the motorized transport unit as the motorized transport unit transports the stocking cart through the retail shopping facility. Based on the detection, the motorized transport unit can be configured to take one or more actions to avoid the motorized transport unit and the stocking cart from contacting the customer or other element. The sensor data may be a distance measurement, a movement sensor, image processing, other such sensor data, or a combination of two or more of such sensor data. Further, the motorized transport unit and/or the central computer system may obtain sensor data from one or more sensors outside of the motorized transport unit. For example, image and/or video processing can be performed on images and/or video captured by other motorized transport units, cameras mounted in the shopping facility, user interface units, and/or other sources. In some instances, the central computer system may communicate additional avoidance instructions to the motorized transport unit in response to an evaluation at the central computer system of sensor data from the motorized transport unit and/or other sources. The actions taken by the motorized transport unit can depend on one or more factors, such as but not limited to distance between the motorized transport unit and the customer or other element, speed at which the motorized transport unit is traveling, weight and/or estimated weight of the stocking cart and products on the stocking cart, estimated rate of the customer and/or other element, determined direction of travel of the customer and/or element, other elements around the motorized transport unit, available space around the motorized transport unit, other such factors, and typically a combination of such factors. In some instances, the action is to stop the motorized transport unit and the stocking cart. In other instances, the motorized transport unit may slow and change direction to avoid the customer and/or element. Accordingly, the motorized transport units are configured to operate in a congested retail shopping facility to support the stocking of products, while still maintaining safety in the retail shopping facility. Further, the motorized transport units can operate in a retail shopping facility where movement of other elements is random and often unexpected. This is in distinction from some systems that limit the activity within an environment where robots operate so that a control system controls all movement within that environment and does not have to take into consideration such safety factors and/or such random activity within the environment.

In some embodiments, one or more sensors on the motorized transport unit are utilized to track movement of a worker and to use that detected movement to better support the worker. This enhanced support can include moving the stocking cart to follow the worker, moving the stocking cart to a location that is anticipated the worker is moving toward (e.g., based on movements of the worker and products being transported by the stocking cart), keeping the motorized transport unit and the stocking cart out of the way of the worker while still being in a position to limit the workers movement to access additional products to be stocked, and other such actions. In some embodiments, the central computer system 106 receives sensor data, which can include sensor data from the motorized transport unit. Using the sensor data, the central computer system is further configured to identify a worker stocking one or more of the products from the stocking cart, and detect from the sensor data that the worker has moved at least a first threshold distance from the stocking cart. In response, the central computer system can direct the motorized transport unit to move the stocking cart to follow the worker and place the stocking cart within a second threshold distance of the worker. The threshold distance can vary depending on the products being stocked, the rate at which the identified worker is stocking products, the movement of the worker, other traffic (e.g., customers' movements, other motorized transport units, etc.) in the area, and the like. As such, in some instances, the central computer system can direct the motorized transport unit to follow the stocking worker.

In some embodiments, the central computer system is further configured to determine when a stocking cart is unloaded and/or empty of the products being stocked on the sales floor. This determination may be based on image and/or video processing from one or more cameras, a determined weight pulled by the motorized transport unit and/or carried by the stocking cart, a notification from a worker, data received from a product scanner used by the worker, detection or lack of detection of RFID tags, other such factors, or a combination of two or more of such factors. The central computer system can then direct the motorized transport unit to perform one or more actions and/or functions in response to determining that the multiple products carried by the stocking cart have been unloaded and/or the stocking cart is empty of products. The central computer system may further determine that the stocking cart is empty of the plurality of products and carries waste material. Based on the waste material, the central computer system can communicate instructions to the motorized transport unit to cause the motorized transport unit to transport the stocking cart to a waste disposal area. Workers at the waste disposal area can remove the waste material and properly dispose of the material. In other instances, the motorized transport unit may cause some or all of the waste material to be disposed in different and appropriate disposal bins (e.g., recycling bin, trash bin, etc.).

Additionally or alternatively, the central computer system may determine that the plurality of products have been unloaded from the stocking cart and communicate instructions to the motorized transport unit to cause the motorized transport unit to transport the unloaded and/or empty stocking cart to a drop location. The central computer system may further communicate instructions to the motorized transport unit instructing the motorized transport unit to retrieve a specified second stocking cart that is carrying a second plurality of products, and to autonomously transport the second stocking cart to the same or a different specified stocking location on the sales floor.

As described above, the motorized transport units are configured to perform multiple different types of tasks at the shopping facility. Accordingly, the central computer system 106 further instructs the motorized transport units to perform other tasks at the shopping facility. In some instances, the central computer system may determine based on the sensor data that the plurality of products have been unloaded from the stocking cart, and can direct the motorized transport unit to perform a second task, of the multiple different tasks, at the retail shopping facility that is unassociated with stocking products and retrieving products.

Figure 6:
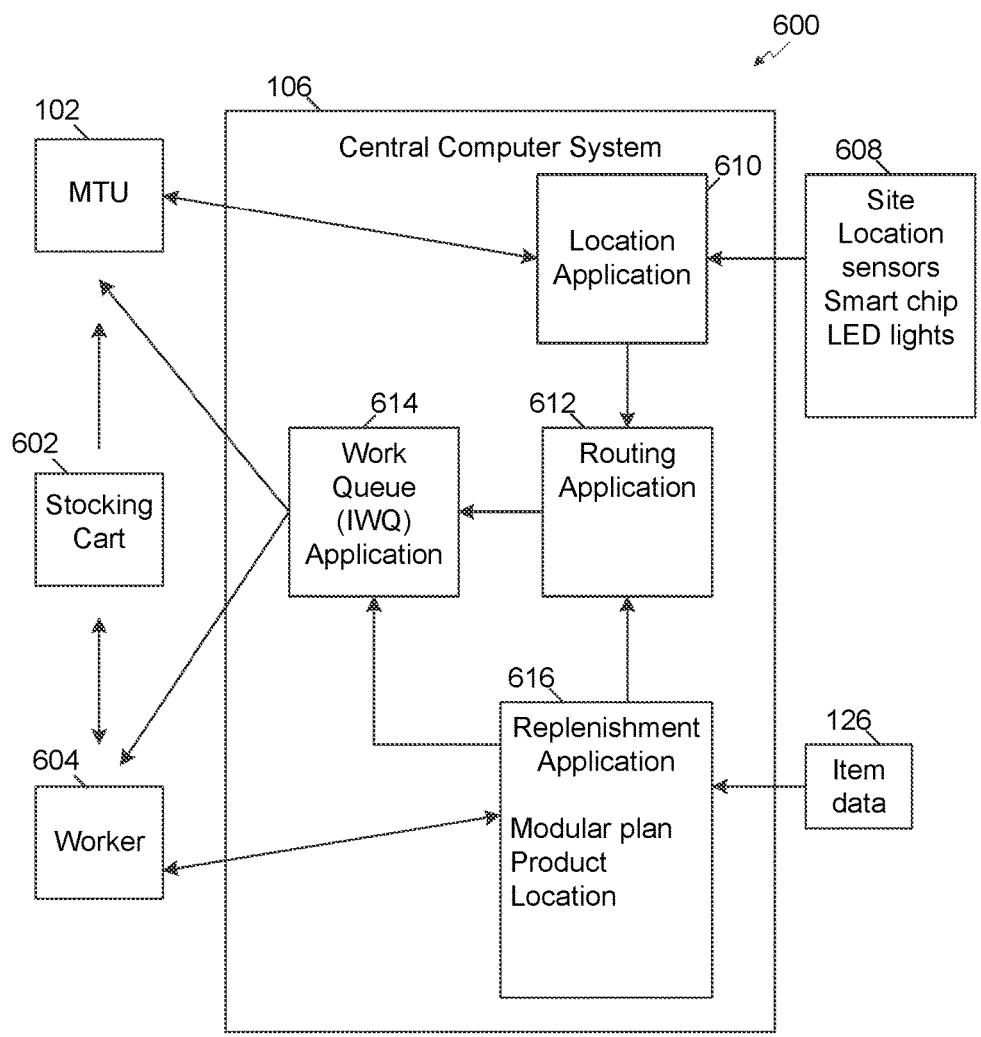
FIG. 6 illustrates a simplified block diagram of some components of an exemplary shopping facility assistance system, in accordance with some embodiments.

FIG. 6 illustrates a simplified block diagram of some components of an exemplary shopping facility assistance system 600, in accordance with some embodiments. The components in part support the stocking of products. The shopping facility assistance system 600 includes the central computer system 106 in communication with multiple motorized transport units 102. Multiple stocking carts 602 are available to be transported through the shopping facility to support the stocking of products on the sales floor. Multiple workers interact with the stocking carts 602, central computer system 106 and/or motorized transport units, in part, to retrieve products from the stocking carts and stock relevant shelves, racks and/or other such product supports. Some embodiments may further include sensors and/or sensor systems 608 that communicate with the central computer system. Further, one or more databases 126 and/or other such information sources can be accessed by the central computer system to obtain product information, stocking information, stocking schedules, product location information, product demand information, sales information and/or other such information that may be used by the central computer system in determining stocking needs, identifying products to be stocked, instructions for loading products on one or more stocking carts, routing information, and the like.

In some embodiments, the central computer system 106 further includes a location application 610, a routing application 612, a work queue application 614, and/or a replenishment application 616. The location application can receive sensor data from motorized transport units, sensor data from a stocking cart, shopping facility sensors, and the like. Based on the sensor data, the location application can determine a location of the motorized transport units, stocking cart, product locations and the like. The routing application 612 can determine optimum routing of the motorized transport units in going to a stocking cart, transporting a stocking cart, moving the stocking cart, returning the stocking cart, and the like. The work queue application can add and track tasks to be performed, including stocking tasks, transporting stocking carts, and the like. The working queue may, in some instances, further maintain and track task queues for each motorized transport unit, including when a stocking task is added to a motorized transport unit task queue. The replenishment application can track product inventory, determine when and where to stock products, and schedule the stocking of products.

Figure 7:
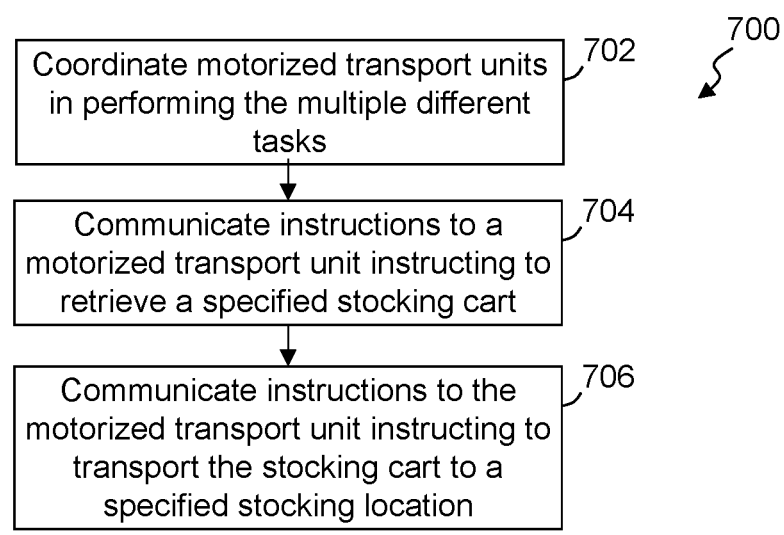
FIG. 7 illustrates a simplified flow diagram of an exemplary process of assisting in stocking of products, in accordance with some embodiments.

FIG. 7 illustrates a simplified flow diagram of an exemplary process 700 of assisting in stocking of products, in accordance with some embodiments. In step 702, the central computer system 106 coordinates a plurality of motorized transport units 102 in performing the multiple different tasks. Many if not all of the motorized transport units are typically configured to perform multiple different types of tasks at the retail shopping facility.

In step 704, the central computer system communicates instructions to a selected motorized transport unit instructing the motorized transport unit to retrieve a specified stocking cart that is carrying a plurality of products that are to be restocked onto product supports that are positioned on the sales floor where customers travel in shopping for products. In some instances, the central computer system identifies a type of mating coupler on the stocking cart and with which one of the motorized transport units is to couple in transporting the stocking cart, and identifies, from the plurality of motorized transport units, that one or more motorized transport units comprise a coupler consistent with the type of mating coupler on the stocking cart. The central computer system can then select at least one of these motorized transport units based on the motorized transport unit comprising the coupler consistent with the type of mating coupler on the stocking cart. In step 706, the central computer system communicates instructions to the motorized transport unit instructing the motorized transport unit to autonomously transport the stocking cart to a specified stocking location on the sales floor corresponding to at least one of the plurality of products carried by the stocking cart.

In some embodiments, the central computer system may further confirm that a stocking pallet has the correct products. For example, the central computer system may receive, from the motorized transport unit, sensor data indicative of a weight of the stocking cart and the plurality of products carried by the stocking cart. Base on the sensor data, the central computer system can confirm that an expected plurality of products is carried by the stocking cart. Additionally or alternatively, the central computer system may receive product scan data, RFID data and the like regarding products moved onto the stocking cart.

Sensor data from sensors on a motorized transport unit can further be used in routing the motorized transport unit and/or to avoid hitting customers and other objects in the shopping facility. Some embodiments detect, through sensor data from one or more sensors on the motorized transport unit, a customer on the sales floor who is within a threshold distance of the motorized transport unit as the motorized transport unit transports the stocking cart through the retail shopping facility. The motorized transport unit can be caused to take one or more actions to avoid the motorized transport unit and the stocking cart from contacting the customer. The action may be based on one or more instructions from the central computer system, may be determined by the motorized transport unit control circuit 406, or the like, Similarly, sensor data may be utilized to cause the motorized transport unit to follow a worker as the worker stocks products from the stocking cart. Some embodiments detect, from sensor data comprising sensor data from the motorized transport unit, a worker stocking one or more of the products from the stocking cart, and detect from the sensor data that the worker has moved at least a first threshold distance from the stocking cart. The motorized transport unit can be directed to move the stocking cart to follow the worker and place the stocking cart within a second threshold distance of the worker.

Some embodiments further detect that all of the products are unloaded from the stocking cart and/or the stocking cart is empty of the plurality of products, and may further detect that the stocking cart carries waste material. In response, the central computer system can communicate instructions instructing the motorized transport unit to transport the stocking cart to a waste disposal area. Similarly, it may be detected that the plurality of products have been unloaded from the stocking cart, and the central computer system may communicate instructions instructing the motorized transport unit to transport the unloaded and/or empty stocking cart to a drop location. Further, the central computer system may communicate instructions instructing the motorized transport unit to retrieve a different specified stocking cart that is carrying a second plurality of products, and to autonomously transport the stocking cart to a specified second stocking location on the sales floor.

Again, many if not all of the motorized transport units are configured to perform multiple different tasks associated with the shopping facility. Some embodiments detect based on the sensor data that the first plurality of products have been unloaded from the stocking cart. Instructions can be communicated to the motorized transport unit, in response to determining the stocking cart is unloaded and/or empty, directing the motorized transport unit to perform a second task of the multiple different tasks at the retail shopping facility and that is unassociated with stocking products and retrieving products.

Figure 8:
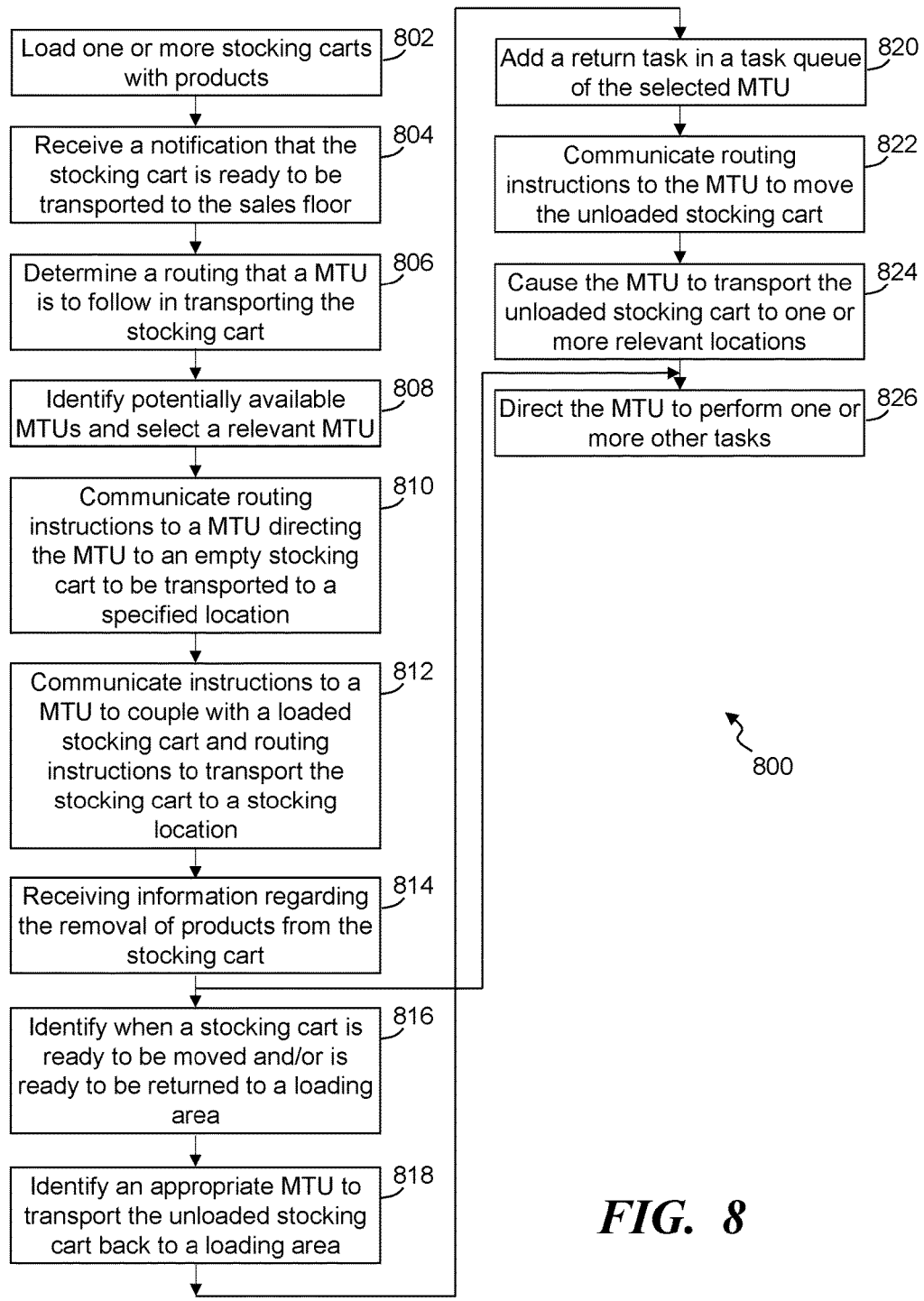
FIG. 8 illustrates a simplified flow diagram of an exemplary process of controlling the movement of motorized transport units in supporting stocking at a shopping facility, in accordance with some embodiments.

FIG. 8 illustrates a simplified flow diagram of an exemplary process 800 of controlling the movement of motorized transport units in supporting stocking at a shopping facility, in accordance with some embodiments. In step 802, one or more stocking carts are loaded with products intended to be stocked on shelves, racks, and/or other such product supports. In some embodiments, the central computer system and/or a product loading system may track a sequence, order of placement and/or location of placement of the products on the stocking cart. The worker or system loading the stocking cart may scan products as they are placed, image processing may be used to track placement on the stocking cart, sensors on the stocking cart may detect placement (e.g., weight sensors, RFID detectors, etc.), and the like.

In step 804, the central computer system is notified that the stocking cart is ready to be transported to the sales floor. This may be based on sensor data from a worker (e.g., from a bar code scanner, RFID detector, etc.), notification from a worker (e.g., through a user interface unit, a notification that loading is complete, etc.), sensor data from the stocking cart and/or other sensors (e.g., cameras), and the like. In some embodiments, the notification may further include an identification of one or more departments and/or areas that the products on the stocking cart are to be taken. The loaded stocking cart may contain products intended for different departments and/or parts of the shopping facility. Accordingly, the central computer system typically has knowledge of the products placed on the stocking cart (e.g., the central computer system may specify which products are placed on the stocking cart, worker stocking the stocking cart may scan products placed on the stocking cart, RFID tags may be read of products placed on the stocking cart, other such determinations, or combination of two or more of such information). Based on the products, the central computer system can direct the motorized transport unit to transport the products to each of the multiple locations in turn to allow one or more workers to retrieve the products from the stocking cart. The information may further identify specific shelves, hooks or the like that products are to be placed.

In step 806, the central computer system uses the location of the stocking cart, the product information and product stocking locations to determine a routing that a motorized transport unit is to follow in transporting the stocking cart. The transport task can be entered into a task queue or work queue. In step 808, the central computer system identifies potentially available motorized transport units and selects a relevant motorized transport unit to cooperate with the loaded stocking cart, and adds the transport task to the selected motorized transport units queue. The selection of the motorized transport unit can be dependent on the type of motorized transport unit, capabilities of the motorized transport unit to move the loaded stocking cart, a coupler on the motorized transport unit that is capable of mating with a coupler on the stocking cart, the capability of the motorized transport unit to operate with the type of loaded stocking cart (e.g., flat bed, pallet, pallet jack, specialty cart, sampling cart, display cart, sorting cart, shopping cart, etc.), task queue, other such factors, and typically a combination of two or more of such factors.

In some instances, optional step 810 is included where the selected motorized transport unit may be directed to an unloaded and/or empty stocking cart to transport the empty stocking cart to a specified location as part of routing the motorized transport unit to the location of the loaded stocking cart. In returning the empty stocking cart, the motorized transport unit may further be directed to one or more disposal areas to dispose of waste on the stocking cart. In step 812, the motorized transport unit couples with the loaded stocking cart, and implements routing instructions to transport the loaded stocking cart. In some embodiments, the motorized transport unit may further notify the central computer system that the motorized transport unit is in transit and moving the stocking cart. Typically, the routing instructions are dependent on the product loading sequence. For example, the routing instructions can cause the motorized transport unit to transport the loaded stocking cart to a location where the products last loaded onto the stocking cart are to be stocked (i.e., last on, first off). As products are removed, the motorized transport unit may move the stocking cart (e.g., to follow a worker, to move to each of one or more different stocking location as products are removed from the stocking cart, and the like).

In step 814, products are removed from the stocking cart by a worker, and in some instances the products removed are tracked (e.g., based on RFID readings, bar code scans by the worker, weight changes, etc.). In step 816, sensor data is monitored to identify when a stocking cart is ready to be moved and/or when a stocking cart is ready to be returned to a loading area. Again, in some instances, the central computer system may direct the motorized transport unit to transport the unloaded stocking cart to a waste disposal area (e.g., carton crusher area, recycle area, trash area, etc.). In step 818, the central computer system can select an appropriate motorized transport unit to transport the unloaded stocking cart back to a loading area when a motorized transport unit is not already cooperated with the stocking cart. In step 820, the return task can be placed in the task queue of the selected motorized transport unit. In step 822, the selected motorized transport unit is provided routing instructions to move to and cooperate with the unloaded stocking cart, and to transport the stocking cart to one or more disposal locations and/or an empty cart location. In step 824, the motorized transport unit is caused to transport the unloaded stocking cart to the one or more relevant locations, and may wait until waste is removed from the stocking cart, then returns the empty stocking cart to a stocking cart corral or other such location. In step 826, the central computer system may direct the motorized transport unit to perform one or more other tasks.

In some implementations, the central computer system can schedule the pulling of stocking carts. Often in retail shopping facilities, workers tend to pull numerous stocking carts out onto the sales floor so that they can proceed to perform stocking without interruption to go to a back storage area to retrieve additional products to be stocked. Such stocking cart pulling can cause congestion on the sales floor, inhibit customers' abilities to access some products, and otherwise interfere with customers' shopping experience. Further, the worker may have to hunt through the multiple pulled stocking carts to find products that the worker is trying to stock. In some embodiments, however, the central computer system can coordinate the pulling of stocking carts as one or more workers are ready for additional products. As such, workers do not need to return to back areas to pull additional stocking carts, and numerous stocking carts are not simultaneously on the sales floor inhibiting customers' shopping experiences. Similarly, the central computer system can direct one or more motorized transport units to return empty stocking carts to a storage area so that workers do not have to take time to move the empty stocking carts.

In some embodiments, systems, apparatuses, processes and methods are provided to assist product stocking on a sales floor of a retail shopping facility. Some embodiments comprise: a plurality of motorized transport units that are each configured to perform multiple different types of tasks at a retail shopping facility; a central computer system configured to coordinate the plurality of motorized transport units in performing the multiple different tasks comprising instruct a first motorized transport unit to retrieve a specified first stocking cart that is carrying a first plurality of products that are to be restocked onto product supports that are positioned on the sales floor where customers travel in shopping for products, and further instruct the first motorized transport unit to autonomously transport the first stocking cart to a specified first stocking location on the sales floor corresponding to at least one of the first plurality of products carried by the first stocking cart.

Further, some embodiments include methods to assists product stocking on a sales floor of a retail shopping facility, comprising: by a central computer system for a retail shopping facility: coordinating a plurality of motorized transport units in performing the multiple different tasks, wherein each of the plurality of motorized transport units are configured to perform multiple different types of tasks at the retail shopping facility; communicating an instruction instructing a first motorized transport unit to retrieve a specified first stocking cart that is carrying a first plurality of products that are to be restocked onto product supports that are positioned on the sales floor where customers travel in shopping for products; and communicating an instruction instructing the first motorized transport unit to autonomously transport the first stocking cart to a specified first stocking location on the sales floor corresponding to at least one of the first plurality of products carried by the first stocking cart.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A system to assist product stocking on a sales floor of a retail shopping facility, comprising:
    a plurality of motorized transport units that are each configured to perform multiple different tasks at a retail shopping facility; and
    a central computer system configured to coordinate the plurality of motorized transport units in performing the multiple different tasks comprising instruct a first motorized transport unit to retrieve a specified first stocking cart that is carrying a first plurality of products that are to be restocked onto product supports that are positioned on the sales floor where customers travel in shopping for products, and further instruct the first motorized transport unit to autonomously transport the first stocking cart to a specified first stocking location on the sales floor corresponding to at least one of the first plurality of products carried by the first stocking cart;
    wherein the central computer system is further configured to detect, from sensor data comprising sensor data from the first motorized transport unit, a worker stocking one or more of the products from the first stocking cart, detect from the sensor data that the worker has moved at least a first threshold distance from the first stocking cart, and direct the first motorized transport unit to move the first stocking cart to follow the worker and place the first stocking cart within a second threshold distance of the worker;
    wherein each of the plurality of motorized transport units is configured to perform the multiple different tasks at the retail shopping facility comprising at least a first set of tasks to support customers comprising at least the first motorized transport unit being configured to temporarily couple with and transport a movable item container configured to receive items for potential purchase by a customer with which the first motorized transport unit is temporarily associated, a second set of tasks to support workers at the retail shopping facility comprising at least the first motorized transport unit being configured to temporarily couple with and transport the first stocking cart, and a third set of tasks regarding facility maintenance at the retail shopping facility to at least perform a clean-up.

2. The system of claim 1, wherein the first motorized transport unit detects, through a sensor on the motorized transport unit, a customer on the sales floor within a threshold distance of the first motorized transport unit as the first motorized transport unit transports the first stocking cart through the retail shopping facility, and takes at least a first action to avoid the first motorized transport unit and the first stocking cart from contacting the customer.

3. The system of claim 1, wherein the central computer system is further configured to receive, from the first motorized transport unit, sensor data indicative of a weight of the first stocking cart and the first plurality of products carried by the first stocking cart, and to confirm based on the sensor data that an expected plurality of products is carried by the first stocking cart.

4. The system of claim 1, wherein the central computer system is further configured to determine based on the sensor data that the first plurality of products have been unloaded from the first stocking cart, and direct the first motorized transport unit to perform a second task, of the multiple different tasks, at the retail shopping facility and that is unassociated with stocking products and retrieving products.

5. The system of claim 1, wherein the central computer system is further configured to determine that the first plurality of products have been unloaded from the first stocking cart, instruct the first motorized transport unit to transport the unloaded first stocking cart to a drop location, and instruct the first motorized transport unit to retrieve a specified second stocking cart that is carrying a second plurality of products, and to autonomously transport the second stocking cart to a specified second stocking location on the sales floor.

6. The system of claim 1, wherein the central computer in directing the first motorized transport unit to follow the worker and place the first stocking cart within the second threshold distance of the worker utilizes the sensor data from the first motorized transport unit and facility sensor data received from sensors external to the first motorized transport unit in determining a distance between the first stocking cart and the worker.

7. The system of claim 1, wherein the central computer is further configured to implement a work queue application that maintains a task queue for each of the plurality of motorized transport units, tracks the task queues in identifying available motorized transport units to perform different tasks, selects the first motorized transport unit to temporarily cooperate with the first stocking cart to perform the task of transporting the first stocking cart based on a first task queues associated with the first motorized transport unit, and adds the assigned transport task to a first task queue.

8. A system to assist product stocking on a sales floor of a retail shopping facility, comprising:
    a plurality of motorized transport units that are each configured to perform multiple different tasks at a retail shopping facility; and
    a central computer system configured to coordinate the plurality of motorized transport units in performing the multiple different tasks comprising instruct a first motorized transport unit to retrieve a specified first stocking cart that is carrying a first plurality of products that are to be restocked onto product supports that are positioned on the sales floor where customers travel in shopping for products, and further instruct the first motorized transport unit to autonomously transport the first stocking cart to a specified first stocking location on the sales floor corresponding to at least one of the first plurality of products carried by the first stocking cart;

wherein the central computer system is further configured to identify a mating coupler on the first stocking cart and with which one of the motorized transport units is to couple in transporting the first stocking cart, identify, from the plurality of motorized transport units, that the first motorized transport unit comprises a coupler consistent with the mating coupler on the first stocking cart, and select the first motorized transport unit based on the first motorized transport unit comprising the coupler consistent with the mating coupler on the first stocking cart;

wherein each of the plurality of motorized transport units is configured to perform the multiple different tasks at the retail shopping facility comprising at least a first set of tasks to support customers comprising at least being configured to temporarily couple with and transport a movable item container configured to receive items for potential purchase by a customer with which the first motorized transport unit is temporarily associated, a second set of tasks to support workers at the retail shopping facility comprising at least the first motorized transport unit being configured to temporarily couple with and transport stocking carts, and a third set of tasks regarding facility maintenance at the retail shopping facility to at least perform a clean-up.

9. A system to assist product stocking on a sales floor of a retail shopping facility, comprising:
a plurality of motorized transport units that are each configured to perform multiple different tasks at a retail shopping facility; and
a central computer system configured to coordinate the plurality of motorized transport units in performing the multiple different tasks comprising instruct a first motorized transport unit to retrieve a specified first stocking cart that is carrying a first plurality of products that are to be restocked onto product supports that are positioned on the sales floor where customers travel in shopping for products, and further instruct the first motorized transport unit to autonomously transport the first stocking cart to a specified first stocking location on the sales floor corresponding to at least one of the first plurality of products carried by the first stocking cart;
wherein the central computer system is further configured to determine that the first plurality of products have been unloaded from the first stocking cart and the first stocking cart carries waste material, and instructs the first motorized transport unit to transport the first stocking cart to a waste disposal area;
wherein each of the plurality of motorized transport units is configured to perform the multiple different tasks at the retail shopping facility comprising at least a first set of tasks to support customers comprising at least being configured to temporarily couple with and transport a movable item container configured to receive items for potential purchase by a customer with which the first motorized transport unit is temporarily associated, a second set of tasks to support workers at the retail shopping facility comprising at least the first motorized transport unit being configured to temporarily couple with and transport stocking carts, and a third set of tasks regarding facility maintenance at the retail shopping facility to at least perform a clean-up.

10. A method to assists product stocking on a sales floor of a retail shopping facility, comprising:
by a central computer system for a retail shopping facility:
coordinating a plurality of motorized transport units in performing the multiple different tasks, wherein each of the plurality of motorized transport units are configured to perform multiple different tasks at the retail shopping facility comprising at least a first set of tasks to support customers comprising at least being configured to temporarily couple with and transport a movable item container configured to receive items for potential purchase by a customer with which the first motorized transport unit is temporarily associated, a second set of tasks to support workers at the retail shopping facility comprising at least the first motorized transport unit being configured to temporarily couple with and transport stocking carts, and a third set of tasks regarding facility maintenance at the retail shopping facility to at least perform a clean-up;
communicating an instruction instructing a first motorized transport unit to retrieve a specified first stocking cart of the stocking carts that is carrying a first plurality of products that are to be restocked onto product supports that are positioned on the sales floor where customers travel in shopping for products;
communicating an instruction instructing the first motorized transport unit to autonomously transport the first stocking cart to a specified first stocking location on the sales floor corresponding to at least one of the first plurality of products carried by the first stocking cart;
detecting, from sensor data comprising sensor data from the first motorized transport unit, a worker stocking one or more of the products from the first stocking cart;
detecting from the sensor data that the worker has moved at least a first threshold distance from the first stocking cart; and
directing the first motorized transport unit to move the first stocking cart to follow the worker and place the first stocking cart within a second threshold distance of the worker.

11. The method of claim 10, further comprising:
detecting, through sensor data from a sensor on the motorized transport unit, a customer on the sales floor within a threshold distance of the first motorized transport unit as the first motorized transport unit transports the first stocking cart through the retail shopping facility; and
causing the first motorized transport unit to take at least a first action to avoid the first motorized transport unit and the first stocking cart from contacting the customer.

12. The method of claim 10, further comprising:
receiving, from the first motorized transport unit, sensor data indicative of a weight of the first stocking cart and the first plurality of products carried by the first stocking cart; and
confirming based on the sensor data that an expected plurality of products is carried by the first stocking cart.

13. The method of claim 10, further comprising:
determining based on the sensor data that the first plurality of products have been unloaded from the first stocking cart; and directing the first motorized transport unit, in response to determining the first stocking cart is unloaded, to perform a second task of the multiple different tasks at the retail shopping facility and that is unassociated with stocking products and retrieving products.

14. The method of claim 10, further comprising:
determining that the first plurality of products have been unloaded from the first stocking cart;
communicating an instruction instructing the first motorized transport unit to transport the unloaded first stocking cart to a drop location; and
communicating an instruction instructing the first motorized transport unit to retrieve a specified second stocking cart that is carrying a second plurality of products, and to autonomously transport the second stocking cart to a specified second stocking location on the sales floor.

15. A method to assists product stocking on a sales floor of a retail shopping facility, comprising:
by a central computer system for a retail shopping facility:
coordinating a plurality of motorized transport units in performing the multiple different tasks, wherein each of the plurality of motorized transport units are configured to perform multiple different tasks at the retail shopping facility comprising at least a first set of tasks to support customers comprising at least being configured to temporarily couple with and transport a movable item container configured to receive items for potential purchase by a customer with which the first motorized transport unit is temporarily associated, a second set of tasks to support workers at the retail shopping facility comprising at least the first motorized transport unit being configured to temporarily couple with and transport stocking carts, and a third set of tasks regarding facility maintenance at the retail shopping facility to at least perform a clean-up;
communicating an instruction instructing a first motorized transport unit to retrieve a specified first stocking cart of the stocking carts that is carrying a first plurality of products that are to be restocked onto product supports that are positioned on the sales floor where customers travel in shopping for products;
communicating an instruction instructing the first motorized transport unit to autonomously transport the first stocking cart to a specified first stocking location on the sales floor corresponding to at least one of the first plurality of products carried by the first stocking cart;
identifying a mating coupler on the first stocking cart and with which one of the motorized transport units is to couple in transporting the first stocking cart;
identifying, from the plurality of motorized transport units, that the first motorized transport unit comprises a coupler consistent with the mating coupler on the first stocking cart, and
selecting the first motorized transport unit based on the first motorized transport unit comprising the coupler consistent with the mating coupler on the first stocking cart.

16. A method to assists product stocking on a sales floor of a retail shopping facility, comprising:
by a central computer system for a retail shopping facility:
coordinating a plurality of motorized transport units in performing the multiple different tasks, wherein each of the plurality of motorized transport units are configured to perform multiple different tasks at the retail shopping facility comprising at least a first set of tasks to support customers comprising at least being configured to temporarily couple with and transport a movable item container configured to receive items for potential purchase by a customer with which the first motorized transport unit is temporarily associated, a second set of tasks to support workers at the retail shopping facility comprising at least the first motorized transport unit being configured to temporarily couple with and transport stocking carts, and a third set of tasks regarding facility maintenance at the retail shopping facility to at least perform a clean-up;
communicating an instruction instructing a first motorized transport unit to retrieve a specified first stocking cart of the stocking carts that is carrying a first plurality of products that are to be restocked onto product supports that are positioned on the sales floor where customers travel in shopping for products;
communicating an instruction instructing the first motorized transport unit to autonomously transport the first stocking cart to a specified first stocking location on the sales floor corresponding to at least one of the first plurality of products carried by the first stocking cart;
determining that the first plurality of products have been unloaded from the first stocking cart and the first stocking cart carries waste material; and
communicating an instruction instructing the first motorized transport unit to transport the first stocking cart to a waste disposal area.

\* \* \* \* \*